US012725950B2

(12) United States Patent
Fan et al.

(10) Patent No.: US 12,725,950 B2
(45) Date of Patent: Sep. 1, 2026

(54) COMPACT HIGH-SPEED ELECTRICAL CONNECTOR

(71) Applicant: Amphenol Commercial Products (Chengdu) Co., Ltd., Chengdu (CN)

(72) Inventors: Jun Fan, Chengdu (CN); Tao Zeng, Chengdu (CN); Ki Ka Lau, Kowloon (HK)

(73) Assignee: Amphenol Commercial Products (Chengdu) Co., Ltd., Chengdu (CN)

(*) Notice: Subject to any disclaimer, the term of this patent is extended or adjusted under 35 U.S.C. 154(b) by 317 days.

(21) Appl. No.: 18/494,129

(22) Filed: Oct. 25, 2023

(65) Prior Publication Data

US 2024/0145958 A1 May 2, 2024

(30) Foreign Application Priority Data

Oct. 27, 2022 (CN) ......................... 202211324598.0
Oct. 27, 2022 (CN) ......................... 202222840622.8

(51) Int. Cl.
*H01R 12/72* (2011.01)
*H01R 12/73* (2011.01)
(Continued)

(52) U.S. Cl.
CPC ......... *H01R 12/724* (2013.01); *H01R 12/721* (2013.01); *H01R 12/737* (2013.01); *H01R 13/514* (2013.01); *H01R 13/518* (2013.01)

(58) Field of Classification Search
CPC .. H01R 13/506; H01R 13/518; H01R 13/514; H01R 12/732; H01R 12/737;
(Continued)

(56) References Cited

U.S. PATENT DOCUMENTS 7,086,889 B2 * 8/2006 Yin ......................... H01R 31/06 439/358
7,485,012 B2 2/2009 Daugherty et al.
(Continued)

FOREIGN PATENT DOCUMENTS

CN 101364692 A 2/2009
CN 101752700 A 6/2010
(Continued)

OTHER PUBLICATIONS

Diaz et al., Controlled-Impedance Compliant Cable Termination, U.S. Appl. No. 18/321,754, filed May 22, 2023.
(Continued)

*Primary Examiner* — Marcus E Harcum
(74) *Attorney, Agent, or Firm* — Wolf, Greenfield & Sacks, P.C.

(57) ABSTRACT

A compact card edge connector for providing high-speed interconnections between different components. The card edge connector includes a mating interface configured to receive a card, a second interface configured to mount to a printed circuit board, and a fourth interface configured to mate with a cable component. The mating interface is perpendicular to the second interface and parallel to the fourth interface. For each column of mating ends at the mating interface, the connector includes two rows mounting ends at the second interface and one column of mounting ends at the fourth interface.

20 Claims, 23 Drawing Sheets

(51) Int. Cl.
*H01R 13/514* (2006.01)
*H01R 13/518* (2006.01)

(58) Field of Classification Search
CPC .. H01R 12/724; H01R 12/721; H01R 12/727; H01R 31/06
USPC .......................................................... 439/634
See application file for complete search history.

(56) References Cited

U.S. PATENT DOCUMENTS 7,494,383 B2 * 2/2009 Cohen ................ H01R 13/6658 439/660
7,497,693 B1 3/2009 Wu
7,534,142 B2 5/2009 Avery et al.
7,540,747 B2 6/2009 Ice et al.
7,540,781 B2 6/2009 Kenny et al.
7,549,897 B2 6/2009 Fedder et al.
7,553,190 B2 6/2009 Laurx et al.
7,581,990 B2 9/2009 Kirk et al.
7,588,464 B2 9/2009 Kim
7,613,011 B2 11/2009 Grundy et al.
7,621,779 B2 11/2009 Laurx et al.
7,652,381 B2 1/2010 Grundy et al.
7,654,831 B1 2/2010 Wu
7,658,654 B2 2/2010 Ohyama et al.
7,686,659 B2 3/2010 Peng
7,690,930 B2 4/2010 Chen et al.
7,713,077 B1 * 5/2010 McGowan ......... H01R 13/6315 439/249
7,719,843 B2 5/2010 Dunham
7,722,401 B2 5/2010 Kirk et al.
7,722,404 B2 5/2010 Neumetzler
7,731,537 B2 6/2010 Amleshi et al.
7,744,414 B2 6/2010 Scherer et al.
7,748,997 B2 * 7/2010 Hamner ............... H01R 12/712 439/79
7,753,731 B2 7/2010 Cohen et al.
7,771,233 B2 8/2010 Gailus
7,775,802 B2 8/2010 Defibaugh et al.
7,789,676 B2 9/2010 Morgan et al.
7,794,240 B2 9/2010 Cohen et al.
7,794,278 B2 9/2010 Cohen et al.
7,811,129 B2 10/2010 Glover et al.
7,819,675 B2 10/2010 Ko et al.
7,824,197 B1 11/2010 Westman et al.
7,828,560 B2 11/2010 Wu et al.
7,857,630 B2 12/2010 Hermant et al.
7,862,344 B2 1/2011 Morgan et al.
7,871,296 B2 1/2011 Fowler et al.
7,874,873 B2 1/2011 Do et al.
7,887,371 B2 2/2011 Kenny et al.
7,906,730 B2 3/2011 Atkinson et al.
7,914,302 B1 3/2011 Zhu
7,914,304 B2 3/2011 Cartier et al.
7,976,318 B2 7/2011 Fedder et al.
7,985,097 B2 7/2011 Gulla
7,993,147 B2 8/2011 Cole et al.
8,002,581 B1 8/2011 Whiteman, Jr. et al.
8,016,616 B2 9/2011 Glover et al.
8,018,733 B2 9/2011 Jia
8,036,500 B2 10/2011 McColloch
8,057,266 B1 11/2011 Roitberg
8,057,267 B2 11/2011 Johnescu
8,083,550 B2 * 12/2011 Zhu ........................ H01R 27/02 439/638
8,083,553 B2 12/2011 Manter et al.
8,092,235 B2 1/2012 Frantum, Jr. et al.
8,092,254 B2 1/2012 Miyazaki et al.
8,100,699 B1 1/2012 Costello
8,157,573 B2 4/2012 Tanaka
8,162,675 B2 4/2012 Regnier et al.
8,167,651 B2 5/2012 Glover et al.
8,182,289 B2 5/2012 Stokoe et al.
8,192,222 B2 6/2012 Kameyama
8,197,285 B2 6/2012 Farmer
8,210,877 B2 7/2012 Droesbeke
8,215,968 B2 7/2012 Cartier et al.
8,226,441 B2 7/2012 Regnier et al.
8,251,745 B2 8/2012 Johnescu
8,272,877 B2 9/2012 Stokoe et al.
8,282,402 B2 10/2012 Ngo
8,308,491 B2 11/2012 Nichols et al.
8,308,512 B2 11/2012 Ritter et al.
8,337,243 B2 12/2012 Elkhatib et al.
8,338,713 B2 12/2012 Fjelstad et al.
8,371,875 B2 2/2013 Gailus
8,371,876 B2 2/2013 Davis
8,382,524 B2 2/2013 Khilchenko et al.
8,398,433 B1 3/2013 Yang
8,419,472 B1 4/2013 Swanger et al.
8,439,704 B2 5/2013 Reed
8,449,312 B2 5/2013 Lang et al.
8,449,330 B1 5/2013 Schroll et al.
8,465,302 B2 6/2013 Regnier et al.
8,469,745 B2 6/2013 Davis et al.
8,535,065 B2 9/2013 Costello
8,540,525 B2 9/2013 Regnier et al.
8,550,861 B2 10/2013 Cohen et al.
8,553,102 B2 10/2013 Yamada
8,556,657 B1 10/2013 Nichols
8,588,561 B2 11/2013 Zbinden et al.
8,588,562 B2 11/2013 Zbinden et al.
8,597,055 B2 12/2013 Regnier et al.
8,632,365 B2 1/2014 Ngo
8,651,880 B2 2/2014 Wu et al.
8,657,627 B2 2/2014 McNamara et al.
8,662,923 B2 3/2014 Wu
8,672,707 B2 3/2014 Nichols et al.
8,678,860 B2 3/2014 Minich et al.
8,690,589 B2 4/2014 Ngo
8,690,604 B2 4/2014 Davis
8,715,003 B2 5/2014 Buck et al.
8,740,644 B2 6/2014 Long
8,753,145 B2 6/2014 Lang et al.
8,758,051 B2 6/2014 Nonen et al.
8,771,016 B2 7/2014 Atkinson et al.
8,787,711 B2 7/2014 Zbinden et al.
8,804,342 B2 8/2014 Behziz et al.
8,814,595 B2 8/2014 Cohen et al.
8,845,364 B2 9/2014 Wanha et al.
8,858,243 B2 10/2014 Luo et al.
8,864,521 B2 10/2014 Atkinson et al.
8,870,471 B2 10/2014 Ito et al.
8,888,531 B2 11/2014 Jeon
8,888,533 B2 11/2014 Westman et al.
8,911,255 B2 12/2014 Scherer et al.
8,926,377 B2 1/2015 Kirk et al.
8,944,831 B2 2/2015 Stoner et al.
8,961,201 B2 * 2/2015 Griese .................. H01R 9/2675 439/121
8,992,236 B2 3/2015 Wittig et al.
8,992,237 B2 3/2015 Regnier et al.
8,998,636 B2 * 4/2015 Gomez ................ H01R 13/665 439/505
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,071,001 B2 6/2015 Scherer et al.
9,077,118 B2 7/2015 Szu et al.
9,118,151 B2 8/2015 Tran et al.
9,119,292 B2 8/2015 Gundel
9,124,009 B2 9/2015 Atkinson et al.
9,142,921 B2 9/2015 Wanha et al.
9,203,171 B2 12/2015 Yu et al.
9,214,768 B2 12/2015 Pao et al.
9,219,335 B2 12/2015 Atkinson et al.
9,225,085 B2 12/2015 Cartier, Jr. et al.
9,232,676 B2 1/2016 Sechrist et al.

(56) References Cited

U.S. PATENT DOCUMENTS 9,246,251 B2 1/2016 Regnier et al.
9,257,778 B2 2/2016 Buck et al.
9,257,794 B2 2/2016 Wanha et al.
9,281,636 B1 3/2016 Schmitt
9,300,067 B2 3/2016 Yokoo
9,312,618 B2 4/2016 Regnier et al.
9,312,965 B2 4/2016 Iemura et al.
9,350,108 B2 5/2016 Long
9,356,401 B1 5/2016 Horning et al.
9,362,678 B2 6/2016 Wanha et al.
9,368,916 B2 6/2016 Heyvaert et al.
9,373,917 B2 6/2016 Sypolt et al.
9,374,165 B2 6/2016 Zbinden et al.
9,385,455 B2 7/2016 Regnier et al.
9,391,407 B1 7/2016 Bucher et al.
9,413,112 B2 8/2016 Helster et al.
9,450,344 B2 9/2016 Cartier, Jr. et al.
9,472,900 B1 10/2016 Phillips et al.
9,490,558 B2 11/2016 Wanha et al.
9,490,587 B1 11/2016 Phillips et al.
9,509,101 B2 11/2016 Cartier, Jr. et al.
9,520,680 B2 12/2016 Hsu et al.
9,520,689 B2 12/2016 Cartier, Jr. et al.
9,531,130 B1 12/2016 Phillips et al.
9,531,133 B1 12/2016 Horning et al.
9,537,239 B1 1/2017 Liu et al.
9,553,381 B2 1/2017 Regnier
9,559,446 B1 1/2017 Wetzel et al.
9,564,696 B2 2/2017 Gulla
9,608,348 B2 3/2017 Wanha et al.
9,651,752 B2 5/2017 Zbinden et al.
9,660,364 B2 5/2017 Wig et al.
9,666,961 B2 5/2017 Horning et al.
9,666,998 B1 5/2017 De Boer et al.
9,685,724 B2 6/2017 Tojo
9,685,736 B2 6/2017 Gailus et al.
9,735,495 B2 8/2017 Gross
9,748,681 B1 8/2017 Champion et al.
9,774,144 B2 9/2017 Cartier, Jr. et al.
9,780,517 B2 * 10/2017 Zerebilov .............. H01R 43/26
9,801,301 B1 10/2017 Costello
9,825,391 B2 11/2017 Cohen et al.
9,841,572 B2 12/2017 Zbinden et al.
9,843,135 B2 12/2017 Guetig et al.
9,923,309 B1 3/2018 Aizawa et al.
9,929,512 B1 3/2018 Trout et al.
9,985,367 B2 5/2018 Wanha et al.
9,985,389 B1 5/2018 Morgan et al.
10,056,706 B2 8/2018 Wanha et al.
10,062,984 B2 8/2018 Regnier
10,062,988 B1 8/2018 Vinther et al.
10,069,225 B2 9/2018 Wanha et al.
10,096,945 B2 10/2018 Cartier, Jr. et al.
10,109,956 B2 * 10/2018 Ju ........................ H01R 13/646
10,114,182 B2 10/2018 Zbinden et al.
10,136,517 B2 11/2018 Shirasaki
10,170,869 B2 1/2019 Gailus et al.
10,181,663 B2 1/2019 Regnier
10,205,286 B2 2/2019 Provencher et al.
10,243,305 B1 3/2019 Pan et al.
10,276,985 B1 4/2019 Liu et al.
10,305,224 B2 5/2019 Girard, Jr.
RE47,459 E 6/2019 Vinther et al.
10,348,007 B2 7/2019 Kataoka et al.
10,359,815 B1 * 7/2019 Lin ...................... H01R 12/721
10,367,280 B2 7/2019 Lloyd et al.
10,367,308 B2 7/2019 Little et al.
10,462,904 B2 10/2019 Shirasaki
10,553,968 B2 2/2020 Consoli et al.
10,651,606 B2 * 5/2020 Little ................. H01R 13/6593
10,680,364 B2 6/2020 Champion et al.
10,763,624 B1 * 9/2020 Henry .................. H01R 13/035
10,840,622 B2 11/2020 Sasame et al.
10,847,937 B2 11/2020 Cartier, Jr. et al.
10,855,020 B1 * 12/2020 Phillips ................ H01R 12/721
10,879,643 B2 12/2020 Astbury et al.
10,944,215 B2 3/2021 Chua et al.
10,958,005 B1 3/2021 Dube
11,025,013 B2 * 6/2021 Little ..................... H01R 12/72
11,050,176 B2 6/2021 Yang et al.
11,070,006 B2 7/2021 Gailus et al.
11,189,943 B2 11/2021 Zerebilov et al.
11,205,877 B2 12/2021 Diaz et al.
11,309,655 B2 4/2022 Avery et al.
11,437,762 B2 9/2022 Manter et al.
11,509,100 B2 11/2022 Chen et al.
11,637,390 B2 4/2023 Zerebilov et al.
11,670,879 B2 6/2023 Zerebilov
11,677,188 B2 6/2023 Diaz et al.
11,715,922 B2 8/2023 Winey et al.
11,735,852 B2 8/2023 Cartier, Jr. et al.
11,757,238 B2 * 9/2023 Little ................... H01R 13/504
439/386
11,824,311 B2 11/2023 Gailus et al.
12,088,028 B2 * 9/2024 Lin ...................... H01R 12/721
12,100,913 B2 * 9/2024 Wu ........................ H01R 12/73
12,107,356 B2 * 10/2024 Little ................ H01R 13/6585
12,199,376 B2 * 1/2025 Yao ........................ H01R 13/66
2009/0011641 A1 1/2009 Cohen et al.
2009/0011645 A1 1/2009 Laurx et al.
2009/0011664 A1 1/2009 Laurx et al.
2009/0017682 A1 1/2009 Amleshi et al.
2009/0023330 A1 1/2009 Stoner et al.
2009/0051558 A1 2/2009 Dorval
2009/0098767 A1 4/2009 Long
2009/0117386 A1 5/2009 Vacanti et al.
2009/0130913 A1 5/2009 Yi et al.
2009/0130918 A1 5/2009 Nguyen et al.
2009/0166082 A1 7/2009 Liu et al.
2009/0176400 A1 7/2009 Davis et al.
2009/0205194 A1 8/2009 Semba et al.
2009/0215309 A1 8/2009 Mongold et al.
2009/0227141 A1 9/2009 Pan
2009/0239395 A1 9/2009 Cohen et al.
2009/0247012 A1 10/2009 Pan
2009/0269971 A1 10/2009 Tamura et al.
2009/0291593 A1 11/2009 Atkinson et al.
2009/0291596 A1 11/2009 Miyazoe
2009/0305533 A1 12/2009 Feldman et al.
2009/0311908 A1 12/2009 Fogg et al.
2010/0009571 A1 1/2010 Scherer et al.
2010/0081302 A1 4/2010 Atkinson et al.
2010/0087084 A1 4/2010 George
2010/0099299 A1 4/2010 Moriyama et al.
2010/0112850 A1 5/2010 Rao et al.
2010/0144167 A1 6/2010 Fedder et al.
2010/0144168 A1 6/2010 Glover et al.
2010/0144175 A1 6/2010 Helster et al.
2010/0144201 A1 6/2010 Defibaugh et al.
2010/0144203 A1 6/2010 Glover et al.
2010/0177489 A1 7/2010 Yagisawa
2010/0183141 A1 7/2010 Arai et al.
2010/0203768 A1 8/2010 Kondo et al.
2010/0217909 A1 8/2010 Pavol et al.
2010/0221951 A1 9/2010 Pepe et al.
2010/0248544 A1 9/2010 Xu et al.
2010/0261384 A1 * 10/2010 Zhang .................. H01R 12/712
439/607.01
2010/0291806 A1 11/2010 Minich et al.
2010/0294530 A1 11/2010 Atkinson et al.
2011/0003509 A1 1/2011 Gailus
2011/0034075 A1 2/2011 Feldman et al.
2011/0067237 A1 3/2011 Cohen et al.
2011/0074213 A1 3/2011 Schaffer et al.
2011/0104948 A1 5/2011 Girard, Jr. et al.
2011/0130038 A1 6/2011 Cohen et al.
2011/0136387 A1 6/2011 Matsuura et al.
2011/0177699 A1 7/2011 Crofoot et al.
2011/0212632 A1 9/2011 Stokoe et al.
2011/0212633 A1 9/2011 Regnier et al.
2011/0212649 A1 9/2011 Stokoe et al.
2011/0212650 A1 9/2011 Amleshi et al.
2011/0223807 A1 9/2011 Jeon et al.
2011/0230095 A1 9/2011 Atkinson et al.

(56) References Cited

U.S. PATENT DOCUMENTS

2011/0230096 A1 9/2011 Atkinson et al.
2011/0230104 A1 9/2011 Lang et al.
2011/0263156 A1 10/2011 Ko
2011/0287663 A1 11/2011 Gailus et al.
2011/0300757 A1 12/2011 Regnier et al.
2011/0300760 A1 12/2011 Ngo
2012/0003848 A1 1/2012 Casher et al.
2012/0034798 A1 2/2012 Khemakhem et al.
2012/0034820 A1 2/2012 Lang et al.
2012/0077369 A1 3/2012 Andersen
2012/0077380 A1 3/2012 Minich et al.
2012/0094536 A1 4/2012 Khilchenko et al.
2012/0135643 A1 5/2012 Lange et al.
2012/0156929 A1 6/2012 Manter et al.
2012/0184136 A1 7/2012 Ritter
2012/0202363 A1 8/2012 McNamara et al.
2012/0202386 A1 8/2012 McNamara et al.
2012/0214344 A1 8/2012 Cohen et al.
2012/0252232 A1 10/2012 Buck et al.
2012/0329294 A1 12/2012 Raybold et al.
2013/0005190 A1* 1/2013 Blanchfield .......... H01R 12/721 439/629
2013/0012038 A1 1/2013 Kirk et al.
2013/0017715 A1 1/2013 Laarhoven et al.
2013/0017733 A1 1/2013 Kirk et al.
2013/0034999 A1 2/2013 Szczesny et al.
2013/0040482 A1 2/2013 Ngo et al.
2013/0065454 A1 3/2013 Milbrand Jr.
2013/0078870 A1 3/2013 Milbrand, Jr.
2013/0084744 A1 4/2013 Zerebilov et al.
2013/0092429 A1 4/2013 Ellison
2013/0109232 A1 5/2013 Paniaqua
2013/0143442 A1 6/2013 Cohen et al.
2013/0196553 A1 8/2013 Gailus
2013/0210246 A1 8/2013 Davis et al.
2013/0223036 A1 8/2013 Herring et al.
2013/0225006 A1 8/2013 Khilchenko et al.
2013/0273781 A1 10/2013 Buck et al.
2013/0288521 A1 10/2013 McClellan et al.
2013/0288525 A1 10/2013 McClellan et al.
2013/0288539 A1 10/2013 McClellan et al.
2013/0340251 A1 12/2013 Regnier et al.
2014/0004724 A1 1/2014 Cartier, Jr. et al.
2014/0004726 A1 1/2014 Cartier, Jr. et al.
2014/0004746 A1 1/2014 Cartier, Jr. et al.
2014/0041937 A1 2/2014 Lloyd et al.
2014/0057475 A1 2/2014 Tohjo
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0073174 A1 3/2014 Yang
2014/0073181 A1 3/2014 Yang
2014/0099844 A1 4/2014 Dunham
2014/0199885 A1 7/2014 Vinther et al.
2014/0242844 A1 8/2014 Wanha et al.
2014/0268536 A1 9/2014 Herman et al.
2014/0273551 A1 9/2014 Resendez et al.
2014/0273557 A1 9/2014 Cartier, Jr. et al.
2014/0273627 A1 9/2014 Cartier, Jr. et al.
2014/0286613 A1 9/2014 Ito et al.
2014/0287627 A1 9/2014 Cohen
2014/0295680 A1 10/2014 YuQiang et al.
2014/0302706 A1 10/2014 YuQiang et al.
2014/0308852 A1 10/2014 Gulla
2014/0335707 A1 11/2014 Johnescu et al.
2014/0335735 A1 11/2014 Cohen et al.
2014/0335736 A1 11/2014 Regnier et al.
2015/0056856 A1 2/2015 Atkinson et al.
2015/0072561 A1 3/2015 Schmitt et al.
2015/0079829 A1 3/2015 Brodsgaard
2015/0079845 A1 3/2015 Wanha et al.
2015/0180578 A1 6/2015 Leigh et al.
2015/0194751 A1 7/2015 Herring
2015/0200483 A1 7/2015 Martin et al.
2015/0200496 A1 7/2015 Simpson et al.
2015/0200508 A1* 7/2015 Martin ................. H01R 13/514 439/695
2015/0207247 A1 7/2015 Regnier et al.
2015/0236450 A1 8/2015 Davis
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2015/0288110 A1 10/2015 Tanguchi et al.
2015/0303608 A1 10/2015 Zerebilov et al.
2015/0357736 A1 12/2015 Tran et al.
2015/0357747 A1 12/2015 Filipon et al.
2015/0357761 A1 12/2015 Wanha et al.
2016/0013594 A1 1/2016 Costello et al.
2016/0013596 A1 1/2016 Regnier
2016/0028189 A1 1/2016 Resendez et al.
2016/0104956 A1 4/2016 Santos et al.
2016/0111825 A1 4/2016 Wanha et al.
2016/0141807 A1 5/2016 Gailus et al.
2016/0149343 A1 5/2016 Atkinson et al.
2016/0149362 A1 5/2016 Ritter et al.
2016/0150633 A1 5/2016 Cartier, Jr.
2016/0150639 A1 5/2016 Gailus et al.
2016/0150645 A1 5/2016 Gailus et al.
2016/0181713 A1 6/2016 Peloza et al.
2016/0181732 A1 6/2016 Laurx et al.
2016/0190747 A1 6/2016 Regnier et al.
2016/0197423 A1 7/2016 Regnier
2016/0218455 A1 7/2016 Sayre et al.
2016/0233598 A1 8/2016 Wittig
2016/0268714 A1 9/2016 Wanha et al.
2016/0268739 A1 9/2016 Zerebilov et al.
2016/0274316 A1 9/2016 Verdiell
2016/0285204 A1 9/2016 Morgan et al.
2016/0308296 A1 10/2016 Pitten et al.
2016/0322770 A1 11/2016 Zerebilov
2016/0344141 A1 11/2016 Cartier, Jr. et al.
2017/0025783 A1 1/2017 Astbury et al.
2017/0033478 A1 2/2017 Wanha et al.
2017/0042070 A1 2/2017 Baumler et al.
2017/0047692 A1 2/2017 Cartier, Jr. et al.
2017/0054250 A1 2/2017 Kim et al.
2017/0077643 A1 3/2017 Zbinden et al.
2017/0093093 A1 3/2017 Cartier, Jr. et al.
2017/0098901 A1 4/2017 Regnier
2017/0162960 A1 6/2017 Wanha et al.
2017/0294743 A1 10/2017 Gailus et al.
2017/0302011 A1 10/2017 Wanha et al.
2017/0338595 A1 11/2017 Girard, Jr.
2017/0365942 A1 12/2017 Regnier
2017/0365943 A1 12/2017 Wanha et al.
2018/0006416 A1 1/2018 Lloyd et al.
2018/0034175 A1 2/2018 Lloyd et al.
2018/0034190 A1 2/2018 Ngo
2018/0040989 A1 2/2018 Chen
2018/0062323 A1 3/2018 Kirk et al.
2018/0109043 A1 4/2018 Provencher et al.
2018/0145438 A1 5/2018 Cohen
2018/0219331 A1 8/2018 Cartier, Jr. et al.
2018/0219332 A1 8/2018 Brungard et al.
2018/0248289 A1 8/2018 Cohen et al.
2018/0269612 A1 9/2018 Pitten et al.
2018/0294602 A1* 10/2018 Wu ...................... H01R 13/635
2018/0309214 A1 10/2018 Lloyd et al.
2018/0366880 A1 12/2018 Zerebilov et al.
2019/0013625 A1 1/2019 Gailus et al.
2019/0020155 A1 1/2019 Trout et al.
2019/0044284 A1 2/2019 Dunham
2019/0104632 A1 4/2019 Nelson et al.
2019/0157812 A1 5/2019 Gailus et al.
2019/0173236 A1 6/2019 Provencher et al.
2019/0260147 A1 8/2019 Pitten et al.
2019/0334292 A1 10/2019 Cartier, Jr. et al.
2020/0212636 A1* 7/2020 Chang ................ H01R 13/6474
2020/0244025 A1 7/2020 Winey et al.
2020/0266585 A1 8/2020 Paniagua et al.
2020/0274267 A1* 8/2020 Zerebilov .......... H01R 13/6581
2020/0274301 A1 8/2020 Manter et al.

(56) References Cited

U.S. PATENT DOCUMENTS

| | | | | |
|---|---|---|---|---|
| 2021/0021085 | A1 | 1/2021 | Diaz et al. | |
| 2021/0091496 | A1 | 3/2021 | Cartier, Jr. et al. | |
| 2021/0159624 | A1 * | 5/2021 | Rubens | H01R 12/724 |
| 2021/0234291 | A1 | 7/2021 | Zerebilov | |
| 2021/0305731 | A1 | 9/2021 | Klein et al. | |
| 2021/0351547 | A1 * | 11/2021 | Little | H01R 13/6581 |
| 2021/0384691 | A1 | 12/2021 | Winey et al. | |
| 2021/0399455 | A1 | 12/2021 | Wang et al. | |
| 2022/0013962 | A1 | 1/2022 | Gailus et al. | |
| 2022/0140513 | A1 * | 5/2022 | Hsiao | H01R 12/721 439/74 |
| 2022/0158371 | A1 | 5/2022 | Zerebilov et al. | |
| 2022/0173537 | A1 | 6/2022 | Fan et al. | |
| 2022/0173550 | A1 | 6/2022 | Liu et al. | |
| 2022/0216652 | A1 | 7/2022 | Chen et al. | |
| 2022/0224032 | A1 * | 7/2022 | Chen | H01R 12/737 |
| 2022/0224057 | A1 | 7/2022 | Diaz et al. | |
| 2023/0064661 | A1 * | 3/2023 | Cavallieri | H01R 13/14 |
| 2023/0253722 | A1 | 8/2023 | Zerebilov | |
| 2023/0299518 | A1 | 9/2023 | Zerebilov et al. | |
| 2023/0307854 | A1 | 9/2023 | Pritchard et al. | |
| 2023/0352866 | A1 | 11/2023 | Cartier, Jr. et al. | |
| 2023/0352895 | A1 | 11/2023 | Winey et al. | |
| 2023/0420882 | A1 * | 12/2023 | Hsu | H01R 13/514 |
| 2024/0258723 | A1 * | 8/2024 | Zerebilov | G02B 6/4246 |

FOREIGN PATENT DOCUMENTS

| | | | | |
|---|---|---|---|---|
| CN | 201562814 | U | 8/2010 | |
| CN | 201956529 | U | 8/2011 | |
| CN | 102598430 | A | 7/2012 | |
| CN | 102823073 | A | 12/2012 | |
| CN | 202678544 | U | 1/2013 | |
| CN | 102986091 | A | 3/2013 | |
| CN | 103140994 | A | 6/2013 | |
| CN | 103682705 | A | 3/2014 | |
| CN | 104025393 | A | 9/2014 | |
| CN | 104348003 | A * | 2/2015 | H01R 13/04 |
| CN | 104518363 | A | 4/2015 | |
| CN | 104779467 | A | 7/2015 | |
| CN | 105051978 | A | 11/2015 | |
| CN | 105612671 | A | 5/2016 | |
| CN | 106025719 | A | 10/2016 | |
| CN | 106030925 | A | 10/2016 | |
| CN | 106104933 | A | 11/2016 | |
| CN | 107408769 | A | 11/2017 | |
| CN | 107645072 | A | 1/2018 | |
| CN | 108028481 | A | 5/2018 | |
| CN | 108475891 | A | 8/2018 | |
| CN | 108713355 | A | 10/2018 | |
| CN | 109273932 | A | 1/2019 | |
| CN | 209313054 | U | 8/2019 | |
| CN | 212571566 | U | 2/2021 | |
| CN | 113078510 | A | 7/2021 | |
| CN | 214100162 | U | 8/2021 | |
| CN | 115347395 | A | 11/2022 | |
| EP | 2169770 | A2 | 3/2010 | |
| JP | 2010-266729 | A | 11/2010 | |
| JP | 2011-018651 | A | 1/2011 | |
| JP | 2012-516021 | A | 7/2012 | |
| JP | 2014-195061 | A | 10/2014 | |
| JP | 2016-528688 | A | 9/2016 | |
| JP | 6193595 | B2 | 9/2017 | |
| JP | 6599548 | B2 | 10/2019 | |
| KR | 10-2015-0067010 | A | 6/2015 | |
| KR | 10-2015-0101020 | A | 9/2015 | |
| KR | 10-2016-0038192 | A | 4/2016 | |
| KR | 10-2016-0076334 | A | 6/2016 | |
| TW | 200910710 | A | 3/2009 | |
| TW | M357771 | U | 5/2009 | |
| TW | 201320504 | A | 5/2013 | |
| TW | I446657 | B | 7/2014 | |
| TW | I465333 | B | 12/2014 | |
| TW | 201521295 | A | 6/2015 | |
| TW | I489002 | B | 6/2015 | |
| WO | WO 2010/039188 | A1 | 4/2010 | |
| WO | WO 2012/078434 | A2 | 6/2012 | |
| WO | WO 2013/006592 | A2 | 1/2013 | |
| WO | WO 2015/013430 | A1 | 1/2015 | |
| WO | WO 2015/112717 | A1 | 7/2015 | |
| WO | WO 2017/015470 | A1 | 1/2017 | |
| WO | WO 2017/123574 | A1 | 7/2017 | |
| WO | WO 2017/164418 | A1 | 9/2017 | |
| WO | WO 2018/226805 | A1 | 12/2018 | |
| WO | WO 2019/195319 | A1 | 10/2019 | |
| WO | WO-2021114162 | A1 * | 6/2021 | H01R 12/716 |

OTHER PUBLICATIONS

Fan et al., High-Quality, High-Speed Card Edge Connector, U.S. Appl. No. 18/484,837, filed Oct. 11, 2023.

Lloyd et al., High Speed Bypass Cable Assembly, U.S. Appl. No. 15/271,903, filed Sep. 21, 2016.

Lloyd et al., High Speed Bypass Cable Assembly, U.S. Appl. No. 15/715,939, filed Sep. 26, 2017.

* cited by examiner

810

820

COMPACT HIGH-SPEED ELECTRICAL CONNECTOR

RELATED APPLICATIONS

This application claims priority to Chinese Patent Application Serial No. 202211324598.0, filed on Oct. 27, 2022. This application also claims priority to Chinese Patent Application Serial No. 202222840622.8, filed on Oct. 27, 2022. The contents of these applications are incorporated herein by reference in their entirety.

FIELD

The present disclosure relates generally to electrical interconnection system, such as those including electrical connectors, used to interconnect electronic assemblies.

BACKGROUND

Electrical connectors are used in electronic systems to connect circuitry on one printed circuit board (PCB) to circuitry on another PCB. For some systems, it may be easier and more cost effective to manufacture the majority of the system's circuitry on separate electronic assemblies, such as PCBs, which may be joined together with electrical connectors. A common example of this is memory cards that plug into electrical connectors on a personal computer's motherboard.

In servers and other powerful computers multiple memory cards may be connected to the same motherboard. The memory cards may contain solid state memory and may serve as solid state drives. In some systems, for example, the memory cards may be orthogonal to the motherboard, and aligned in parallel along an edge of the motherboard. Such a configuration is described in an industry standard SFF-TA-1007.

Card edge connectors are configured to support this configuration, as they may be mounted to a PCB and mated with an add-in card, such as a memory card. A card edge connector may have a mating interface with a slot sized to receive an edge of the add-in card. Conductors, with a mating contact at one end and a tail at the other end, may pass through a connector from the slot to a mounting interface. At the mounting interface the tails may be attached to the PCB. At the mating interface, the mating contacts may be exposed in the slot, where they can make electrical contacts to pads on an edge of the add-in card inserted into the slot.

A conventional card edge connector has two columns of mating contact portions, one on each side of the slot. The tails of the conductors are similarly arrayed in two rows along the PCB.

SUMMARY

Aspects of the present disclosure relate to compact high-speed connectors.

Some embodiments relate to an electrical connector. The electrical connector may include a housing comprising a slot elongating in a direction perpendicular to a mating direction; and a plurality of conductive elements held by the housing, each of the plurality of conductive elements comprising a first end curving into the slot and a second end opposite the first end. The first ends of the plurality of conductive elements may be arranged in a first column. The second ends of a first subset of the plurality of conductive elements may be arranged in one or more rows perpendicular to the first column. The second ends of a second subset of the plurality of conductive elements may be arranged in a second column parallel to the first column.

Optionally, the second ends of a first subset of the plurality of conductive elements may be arranged in two rows.

Optionally, the slot is a first slot; the housing comprises a second slot elongating in the direction perpendicular to a mating direction; and the second ends of the second subset of conductive elements curve into the second slot.

Optionally, the electrical connector may include a first wafer housing holding the first subset of conductive elements; and a second wafer housing holding the second subset of conductive elements. The second wafer housing may be stacked on the first wafer housing.

Optionally, the plurality of conductive elements comprise a third subset of conductive elements separated from the second subset of conductive elements by a member of the housing; and the second ends of the third subset of conductive elements may be arranged in the second column.

Optionally, the electrical connector may include a shell holding the housing and comprising grooves separating portions of the shell from the housing.

Optionally, the electrical connector may include a latch pivotably connected to the shell.

Optionally, the housing may comprise a first housing comprising the slot and a second housing attached to the first housing; and the second housing may be shorter than the first housing in the direction perpendicular to the mating direction.

Optionally, the electrical connector may include a first wafer housing holding the first subset of conductive elements. The second housing may be stacked on the first wafer housing.

Some embodiments relate to an electrical connector. The electrical connector may include a plurality of conductive elements each comprising a first end and a second end opposite the first end, the plurality of conductive elements comprising a first subset of conductive elements and a second subset of conductive elements; a first wafer comprising a first interface and a second interface perpendicular to the first interface, the first interface comprising the first ends of the first subset of conductive elements, the second interface comprising the second ends of the first subset of conductive elements; and a second wafer comprising a third interface aligned with the first interface and a fourth interface parallel to the third interface, the third interface comprising the first ends of the second subset of conductive elements, the fourth interface comprising the second ends of the second subset of conductive elements.

Optionally, for the first subset of conductive elements: every other conductive element may comprise a bend such that the second ends may be disposed in two rows.

Optionally, for the second subset of conductive elements: the first ends and the second ends may be in symmetry with respect to a plane parallel to the first interface.

Optionally, the second subset of conductive elements may be configured to carry signals at a speed higher than the first subset of conductive elements.

Optionally, each of the conductive elements may comprise an intermediate portion between the first end and the second end; and the second subset of conductive elements comprise pairs of conductive elements having intermediate portions jogging towards each other.

Optionally, the intermediate portion of each of the first subset of conductive elements may have a uniform width along its length.

Some embodiments relate to an electrical connector. The electrical connector may include a housing comprising a slot elongating in a direction perpendicular to a mating direction; a first plurality of conductive elements held by the housing, each of the first plurality of conductive elements comprising a first end curving into the slot and a second end opposite the first end and configured to mounted to a printed circuit board; and a second plurality of conductive elements held by the housing, each of the second plurality of conductive elements comprising a first end curving into the slot and a second end opposite the first end and configured to mate with a cable component.

Optionally, the first end of each of the first plurality of conductive elements may comprise a tip having a first length; the first end of each of the second plurality of conductive elements may comprise a tip having a second length; and the second length may be shorter than the first length.

Optionally, the second plurality of conductive elements comprise pairs of signal conductive elements separated by ground conductive elements.

Optionally, the housing may comprise a first housing comprising the slot and a second housing attached to the first housing; and the second housing may be shorter than the first housing in the direction perpendicular to the mating direction.

Optionally, the first plurality of conductive elements may be held by a wafer housing; and the second housing may be stacked on the wafer housing.

Some embodiments relate to an electrical connector. The electrical connector may comprise an insulating housing comprising a first slot elongating in a direction perpendicular to a mating direction, and a plurality of conductive elements held by the insulating housing. Each of the plurality of conductive elements may comprise a mating end curving into the first slot and a mounting end opposite the mating end. The mating ends of the plurality of conductive elements may be arranged in a first column. The plurality of conductive members may comprise a first plurality of conductive elements and a second plurality of conductive elements. The mounting ends of the first plurality of conductive elements may be arranged in one or more rows perpendicular to the first column; and the mounting ends of the second plurality of conductive elements may be arranged in a second column parallel to the first column.

Optionally, the mounting ends of the first plurality of conductive elements may be aligned in two rows.

Optionally, the insulating housing may further comprise a second slot elongating in the direction perpendicular to the mating direction, and the mounting ends of the second plurality of conductive elements may curve into the second slot.

Optionally, the electrical connector may further comprise a first wafer housing holding the first plurality of conductive elements, and a second wafer housing holding the second plurality of conductive elements. The second wafer housing may be stacked on the first wafer housing.

Optionally, the first wafer housing and the second wafer housing may be disposed successively in a direction parallel to the first column and away from the mounting ends of the first plurality of conductive elements.

Optionally, the second plurality of conductive members may comprise a plurality of groups of conductive elements. The plurality of groups of conductive elements may be separated by a member of the insulating housing. The mounting ends of the plurality of groups of conductive elements may be arranged in the same column.

Optionally, the mating ends of the plurality of groups of conductive elements may be aligned in the same column.

Optionally, the electrical connector may further comprise a plurality of second wafer housing holding the plurality of groups of conductive elements, respectively. The second wafer housings holding different groups of conductive elements may be successively disposed in a direction parallel to the first column.

Optionally, the electrical connector may further comprise an outer shell holding the insulating housing and including recesses separating portions of the outer shell from the insulating housing.

Optionally, the electrical connector may further comprise a latch pivotably connected to the outer shell.

Optionally, the insulating housing may comprise a first insulating housing having the first slot and a second insulating housing attached to the first insulating housing. The second insulating housing may be shorter than the first insulating housing in the direction perpendicular to the mating direction.

Optionally, the electrical connector may further comprise a first wafer housing holding the first plurality of conductive elements and a second wafer housing holding the second plurality of conductive elements. The second wafer housing may be stacked on the first wafer housing.

Optionally, the first wafer housing may be held by the first insulating housing, and the second wafer housing may be held by the first insulating housing and the second insulating housing.

Optionally, in the direction perpendicular to the mating direction, the first insulating housing and the second insulating housing may be aligned at their one ends, and the mounting ends of the first plurality of conductive elements may protrude from a portion of the first insulating housing beyond the second insulating housing.

Some embodiments relate to an electrical connector. The electrical connector may comprise a plurality of conductive elements, a first wafer and a second wafer. The plurality of conductive elements each may comprise a mating end and a mounting end opposite the mating end. The plurality of conductive elements may comprise a first plurality of conductive elements and a second plurality of conductive elements. The first wafer may comprise a first mating interface and a first mounting interface perpendicular to the first mating interface. The first mating interface may include the mating ends of the first plurality of conductive elements, and the first mounting interface may include the mounting ends of the first plurality of conductive elements. The second wafer may comprise a second mating interface aligned with the first mating interface and a second mounting interface parallel to the second mating interface. The second mating interface may include the mating ends of the second plurality of conductive elements, and the second mounting interface may include the mounting ends of the second plurality of conductive elements.

Optionally, the first plurality of conductive elements may include bends so that the mounting ends thereof may be arranged in two rows.

Optionally, the mating ends and the mounting ends of the second plurality of conductive elements may be in symmetry.

Optionally, the first plurality of conductive elements may be configured to transmit signals at a first speed, and the second plurality of conductive elements may be configured to transmit signals at a second speed being greater than the first speed.

Optionally, each of the plurality of conductive elements may include an intermediate portion joining the mating end and the mounting end. The second plurality of conductive elements may include pairs of conductive elements. The intermediate portions of the pairs of signal conductive elements may have undulating portions at the sides towards each other.

Some embodiments relate to an electrical connector. The electrical connector may comprise an insulating housing having a first slot elongating in a direction perpendicular to a mating direction; a first plurality of conductive elements held by the insulating housing; and a second plurality of conductive elements held by the insulating housing. Each of the first plurality of conductive elements may comprise a mating end curving into the first slot and a mounting end opposite to the mating end and configured to be mounted to a printed circuit board. Each of the second plurality of conductive elements may comprise a mating end curving into the first slot and a mounting end opposite to the mating end and configured to mate with a cable component.

Optionally, the mating end of each of the first plurality of conductive elements may have a tip with a first length; and the mating end of each of the second plurality of conductive elements may have a tip with a second length. The second length may be shorter than the first length.

Optionally, the second plurality of conductive elements may comprise pairs of high-speed signal conductive elements separated by ground conductive elements.

Optionally, the insulating housing may comprise a first insulating housing with the first slot and a second insulating housing attached to the first insulating housing. The second insulating housing may be shorter than the first insulating housing in the direction perpendicular to the mating direction.

Optionally, the second insulating housing may have a second slot, and the mounting ends of the second plurality of conductive elements curve into the second slot. An opening of the first slot and an opening of the second slot may be back to each other in the mating direction.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

Figure 1A:
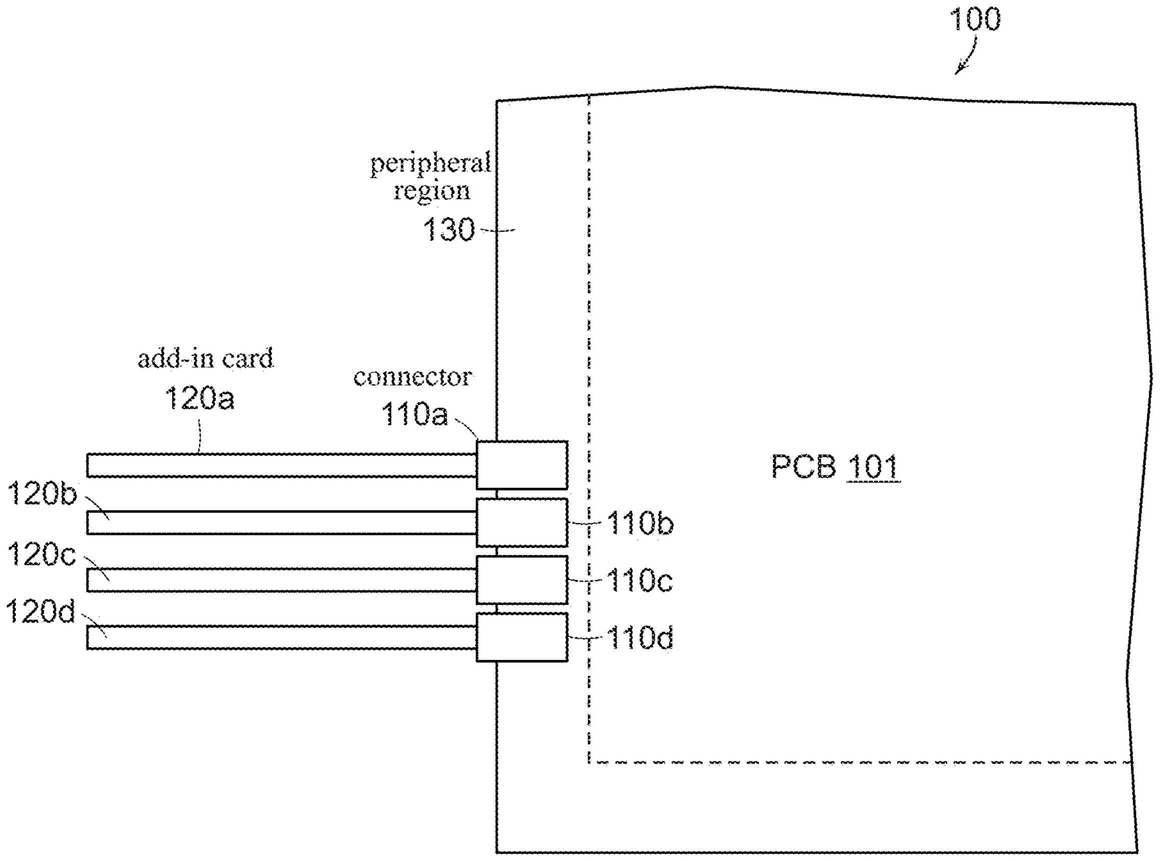
FIG. 1A is a top plan view of an example application of electrical connectors, in which the electrical connectors according to some embodiments are mounted in a peripheral region of a printed circuit board for connecting add-in cards to the printed circuit board.

The above accompanying drawings include the following reference signs:

100, electronic system; 101, printed circuit board; 110*a*, 110*b*, 110*c*, 110*d*, electrical connector, 120*a*, 120*b*, 120*c*, 120*d*, add-in card; 130, peripheral region; 200, electrical connector, 300, insulating housing; 301, first slot; 301*a*, opening; 302, second slot; 302*a*, opening; 303, rib; 310, first insulating housing; 311*a*, 311*b*, first groove; 320, second insulating housing; 321, second groove; 400, conductive element; 401, mating end; 402, mounting end; 403, intermediate portion; 403*a*, notch; 403*b*, serration; 410, a first plurality of conductive elements; 411, mating ends of the first plurality of conductive elements; 411*a*, tips of the first plurality of conductive elements; 412, mounting ends of the first plurality of conductive elements; 413, bend; 414, mating contact portions of the first plurality of conductive elements; 420, second plurality of conductive elements; 420*a*, signal conductive element; 420*b*, ground conductive element; 421, mating ends of the second plurality of conductive elements; 421*a*, tips of the second plurality of conductive elements; 422, mounting ends of the second plurality of conductive elements; 424, mating contact portions of the second plurality of conductive elements; 510, first wafer (or board mount wafer); 511, first mating interface (or first interface); 512, first mounting interface (or second interface); 520, second wafer (or pass through wafer); 521, second mating interface (or third interface); 522, second mounting interface (or fourth interface); 600, outer shell; 610, recess; 620, latch; 621, hook; 622, operating member; 623, pivoting portion; 630, pivoting mating portion; 640, positioning post; 650, threaded hole; 710, strengthening sheet; 720, U-shaped clamping member, 810, first wafer housing; 811, first protrusion; 812, first block; 813, mounting portion; 820, second wafer housing; 821*a*, 821*b*, second protrusion; 822, second block; 910, add-in card; 920, printed circuit board; 930, cable component; 931, engaging groove.

DETAILED DESCRIPTION

The Inventors have recognized and appreciated design techniques for compact connectors to provide high-speed interconnections between different devices. The Inventors have recognized and appreciated that as electronic systems become more advanced, more channels and/or processing functionalities may be added. For example, the amount of circuitry and circuit density on a system's midplane, backplane, or motherboard may increase. In some cases, the midplane, backplane, or motherboard may be constrained in size (e.g., to fit into standardized server cabinets or other package) though the add-in cards may increase in size. Internet servers and routers are examples of data-handling systems that may support multiple high data-rate channels. Data transmission rates for each channel in such systems may be up to and well over 10 Gigabit/sec (Gb/s). In some implementations, data rates may be as high as 150 Gb/s, for example. Conventional connectors cannot carry data for multiple such high-speed data channels while meet the dimensional constrains. Aspects of the present disclosure enable compact connectors to provide high-speed interconnections.

An electrical connector may have conductive elements having mating ends, which may form a mating interface with a large number of mating ends aligned in one or more columns. Some of the conductive elements in a column may serve as high-speed signal conductors. Some of the conductive elements may serve as ground conductors referencing the high-speed signals. It should be appreciated that ground conductors need not to be connected to earth ground, but are shaped to carry reference potentials, which may include earth ground, DC voltages or other suitable reference potentials. Other conductive elements may serve as low-speed signal conductors or power conductors. Some of the low-speed signal conductors may also be designated as grounds, referencing the low-speed signals or providing a return path for those signals.

A connector may have a plurality of conductive elements with mating ends (which may be referred to as first ends) at a mating interface of the connector. The other ends of the conductive elements, referred to herein as the mounting ends or second ends, may be configured for connection to other components. For a first subset of the conductive elements, the second ends may be configured to mount to a printed circuit board (PCB). These second ends, for example, may be configured as pressfits or solder tails or may be configured for attaching to a solder ball, for example. A second subset of the conductive elements may have second ends configured to mate with a cable component. The first subset of the conductive elements may be used for low-speed signals. The second subset of conductive elements may be used for high-speed signals. For example, the second ends of the low-speed signal conductors may be configured to mount to the PCB so that the connector may occupy an area that extends a relatively small distance from the edge of the PCB. The second ends of the high-speed signal conductors may be configured to mate with a cable component so as to transmit data directly through the connector without the additional routing through the PCB.

Figure 6A:
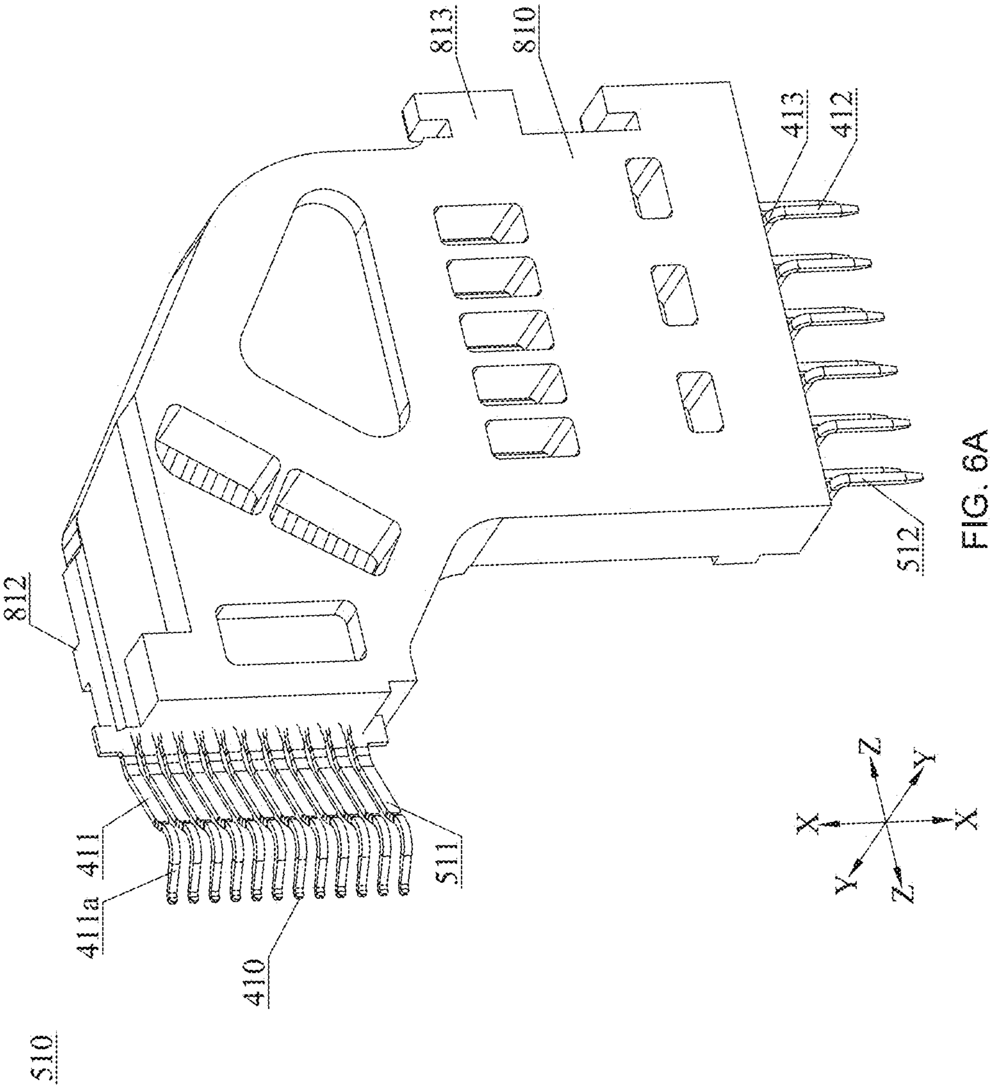
FIG. 6A is a perspective view of a board mount wafer of FIG. 4.
Figure 7A:
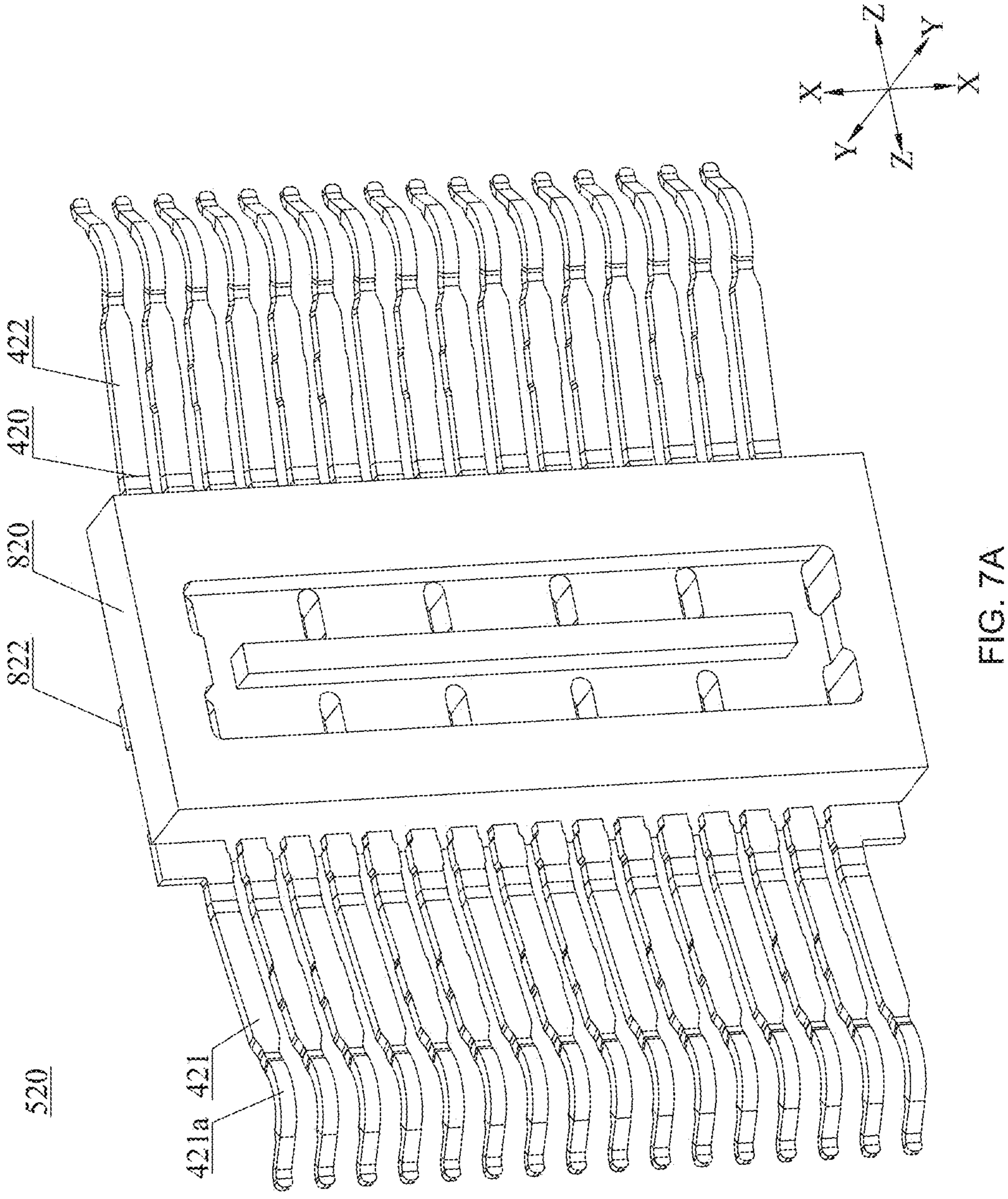
FIG. 7A is a perspective view of a pass through wafer of FIG. 4.

The connector may itself also have an economical design. In some embodiments, the connector may be implemented with multiple types of wafers. The connector may include first wafers and second wafers. The first and second wafers may have conductive elements configured for making different types of connections. As a result of different types of wafers within a connector, connections between three or more interfaces may be formed. For example, the connector may include first wafers for the low-speed signal conductors and second wafers for the high-speed signal conductors. Each first wafer may include low-speed signal conductors having first ends aligned in a column at the mating interface and second ends aligned in one or more rows at a second interface. Each second wafer may include high-speed signal conductive elements having first ends aligned in a column at the mating interface and second ends aligned in a column at a fourth interface. A second wafer may be stacked on a first wafer such that the first ends of the two kinds of wafers are aligned in a column. Another second wafer may be stacked on the second wafer such that the first ends of these wafers are aligned in a column. Such configuration enables wafers used for add-in cards of one size to be re-used in connectors that mate with larger add-in cards. In FIG. 6A, board mount wafer 510 is an example of a first wafer. In this example, conductive elements of the board mount wafer 510 may make connections between a mating interface and an interface 512 configured to mount to a printed circuit board. In FIG. 7A, pass through wafers 520 are examples of second wafers. In this example, conductive elements of each pass through wafer 520 may make connections between the mating interface and another interface 522 configured to mate with a cable component.

When configured as a card edge connector, such connectors may enable economical system architectures for integrating powerful add-in cards in a server or other computer system. In some embodiments, a connector may be configured as a card edge connector and one or more such connectors may be mounted in a relatively small peripheral region along an edge of a PCB of the server or other computer system. Such a connector may have a mating interface that has at least one column of mating contacts designed to mate with pads on a surface of an add-in card, such as a memory card. As a relatively large number of mating contact portions may be provided, a large memory array may be connected to the PCB, while enabling a relatively small and low-cost PCB to be used.

In some embodiments, multiple such connectors may be mounted along the edge of the PCB. A system, for example, may have a PCB serving as a motherboard, with multiple add-in cards, each of which holds a large number of non-volatile memory chips. The connectors may enable a relatively large memory array to be connected to the components on the motherboard. The memory array may serve, for example, as a solid-state drive.

The memory cards may be spaced from each other in the direction of the edge of the PCB to ensure an adequate flow of cooling air in the system. As the connectors are conventionally spaced on the same pitch as the memory cards, in a system implemented with conventional connectors, the connectors may be separated by regions of the PCB. Those regions of the PCB may be largely unused, as they are neither occupied by the connector footprint nor used for functional components mounted to the PCB. With a connector design as described herein, however, the area of the unused regions of the PCB between connectors may be less, as multiple rows of contact tails per column of mating contact portions results in a wider connector footprint. In this way, unused space between connectors is used to lessen the distance into the PCB that the connector footprint extends, enabling a smaller and lower cost PCB to be used.

The Inventors have recognized and appreciated that various technologies may be used, individually or in any suitable combination, to improve signal integrity of electrical connectors. The technologies provided in the present disclosure can be particularly advantageous in orthogonal electrical connectors. Electrical connectors can be effectively reduced in dimensions by utilizing these technologies, and provide both high-speed interconnection and low-speed interconnection to form dual interfaces. The technologies provided by the present disclosure can also be employed for other types of electrical connectors which will not be repeated herein.

Figure 1B:
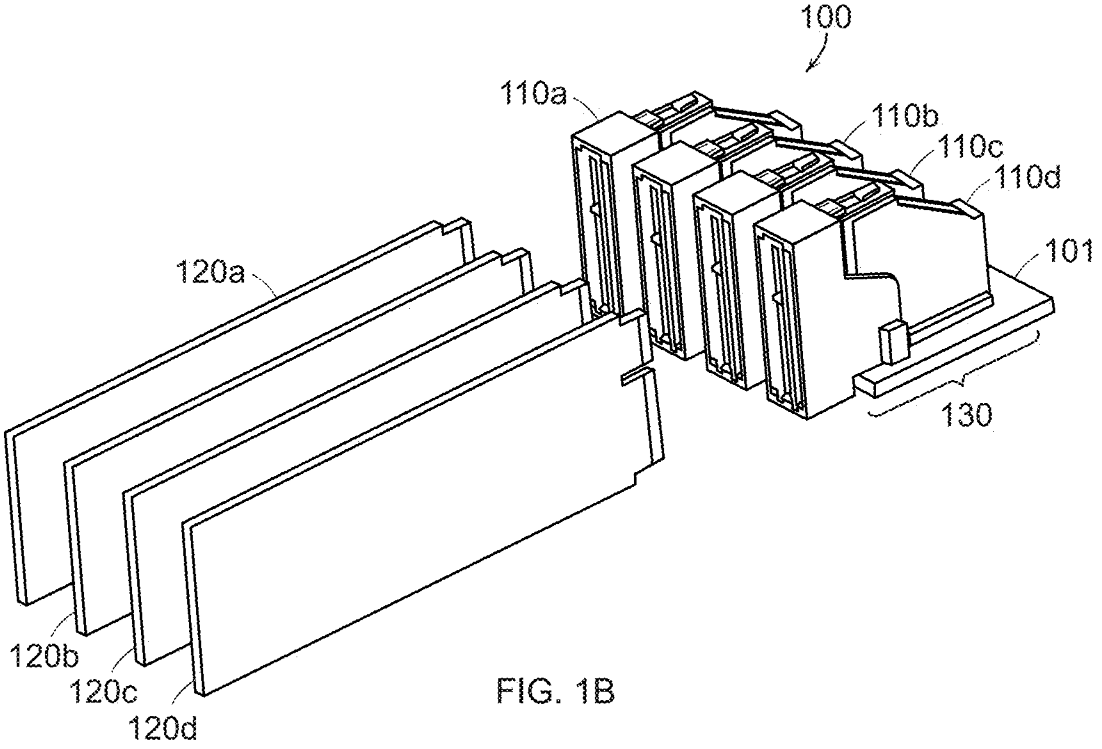
FIG. 1B is a partial exploded perspective view of the example application of FIG. 1A, prior to inserting the add-in cards into the electrical connectors.

An example electronic system 100 where such multi-row electrical connectors may be used is depicted in FIGS. 1A-1B. The illustrated electronic system 100 may be part of a server, for example. A printed circuit board 101 (a portion of which is shown) may be a motherboard of a server, which may include circuitry and patterned conductors on one or more levels of the PCB. The electronic system 100 may also include one or more electrical connectors 110*a* . . . 110*d* that receive add-in cards 120*a* . . . 120*d*. The electrical connectors 110*a* . . . 110*d* may be located in a peripheral region 130 of the printed circuit board 101 and provide a plurality of interconnect paths between the printed circuit board 101 and the add-in cards 120*a* . . . 120*d*. For the configuration shown in FIGS. 1A-1B, the electrical connectors may be referred to as "orthogonal" connectors since the connected add-in cards 120*a* . . . 120*d* have their circuit planes or broad surfaces oriented orthogonal to the circuit plane(s) of the printed circuit board 101. According to some implementations, the printed circuit board 101 and add-in cards 120*a* . . . 120*d* may be assembled in a support frame or enclosure to fit into one standard unit (1 U) of an information technology (IT) equipment rack (e.g., approximately 1.75 inches high for a 19-inch-wide or 23-in-wide equipment rack). The add-in cards may contain non-volatile memory chips and may be used in the system as solid-state drives (SSDs).

In some implementations, such multi-row electrical connectors 110*a* . . . 110*d* may conform to industry standards or specifications in some cases, such as the small form factor (SFF) specifications. As just one example, an electrical connector may receive cards that conform to the SFF-TA-1007 specification. The specification may specify a number, arrangement, and spacing of contact pads on an add-in card that electrically connect to contacts on the multi-row connector. In some embodiments, the center-to-center spacing between contact pads on the add-in cards 120*a* . . . 120*d* can be essentially or exactly 0.6 millimeters (mm), though other spacings may be used in other embodiments. For the SFF-TA-1007 specification, there may be between 56 and 84 contact pads (or between approximately those end values) divided between two sides of the add-in card. In some cases, there may be more contact pads on the cards to which the connector may need to provide mating contacts.

A specification may also specify a spacing between the add-in cards 120*a* . . . 120*d*, which may be used for air flow between the cards, according to some embodiments. In some implementations, there may be fans on the PCB that move air between the add-in cards 120*a* . . . 120*d*. In some embodiments, there may be more than one spacing between the add-in cards that are specified. The fans may be oriented to blow air from right to left or left to right in FIGS. 1A and 1B, for example. The different spacings may be for different levels of power drawn by different add-in cards (e.g., at least 9.5 mm center-to-center spacing for up to 25 watts and at least 18 mm center-to-center spacing for up to 40 watts).

The Inventors have further recognized and appreciated that it can be beneficial to make connectors compatible with different types of cards (e.g., versions of add-in cards 120*a* . . . 120*d* with fewer or more contact pads that connect to mating contacts in the electrical connectors 110*a* . . . 110*d* when the cards 120*a* . . . 120*d* are plugged into the electrical connectors 110*a* . . . 110*d*). Additionally, it can be beneficial if the electrical connector's length does not exceed a maximum length (in a direction perpendicular to the edge of the PCB to which the connector is mounted) of prior versions of the electrical connector, so that the electrical connectors 110*a* . . . 110*d* can fasten into a same peripheral region of a PCB 101 as a prior version of the electrical connector. In some embodiments, it may be beneficial if the electrical connectors 110*a* . . . 110*d* extend less distance toward a center of the PCB 101 than prior versions of the connector.

Figure 2A:
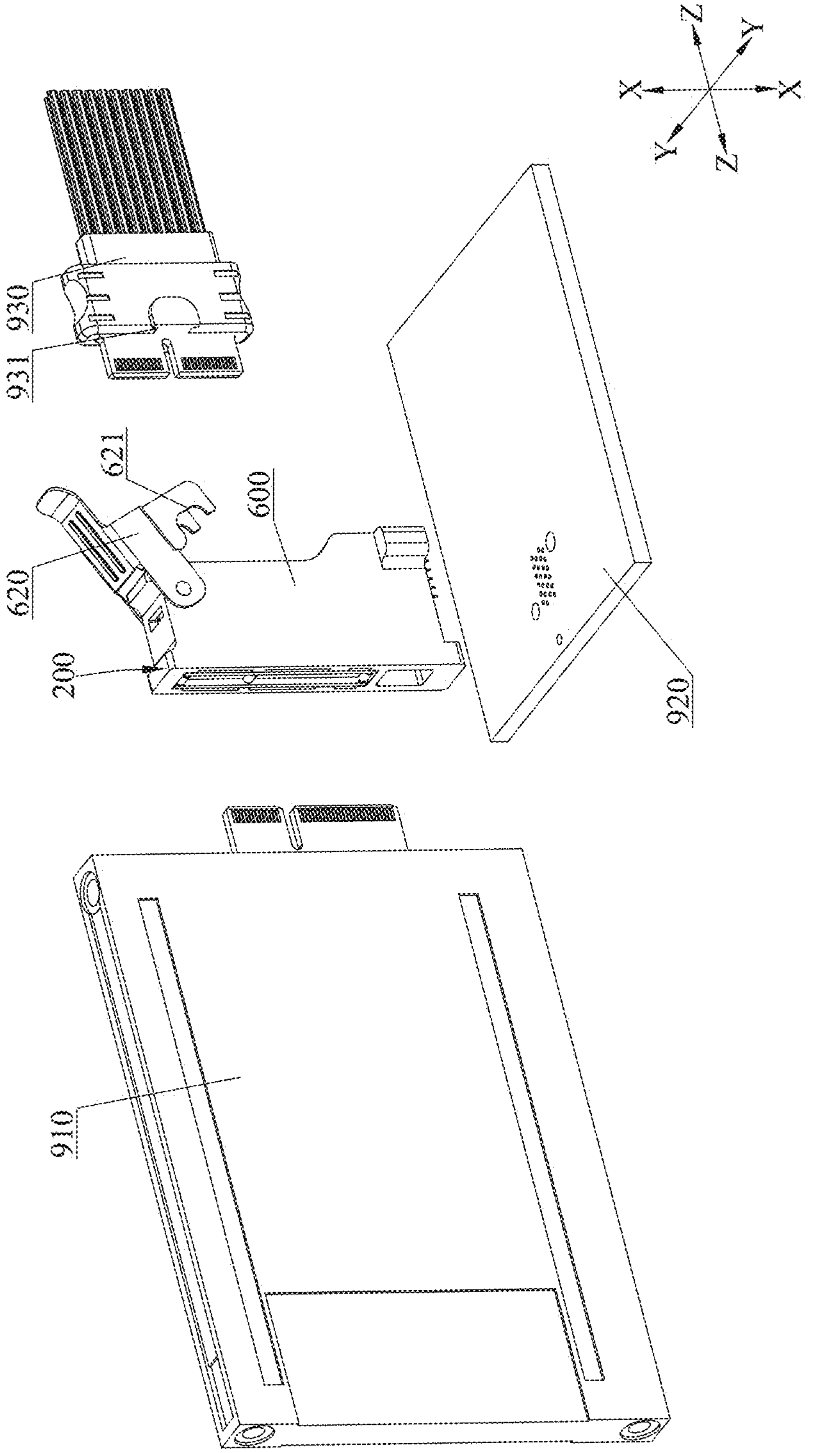
FIG. 2A is an exploded perspective view of an electronic system comprising an electrical connector configured to interconnect an add-in card, a printed circuit board, and a cable component, according to some embodiments.
Figure 2B:
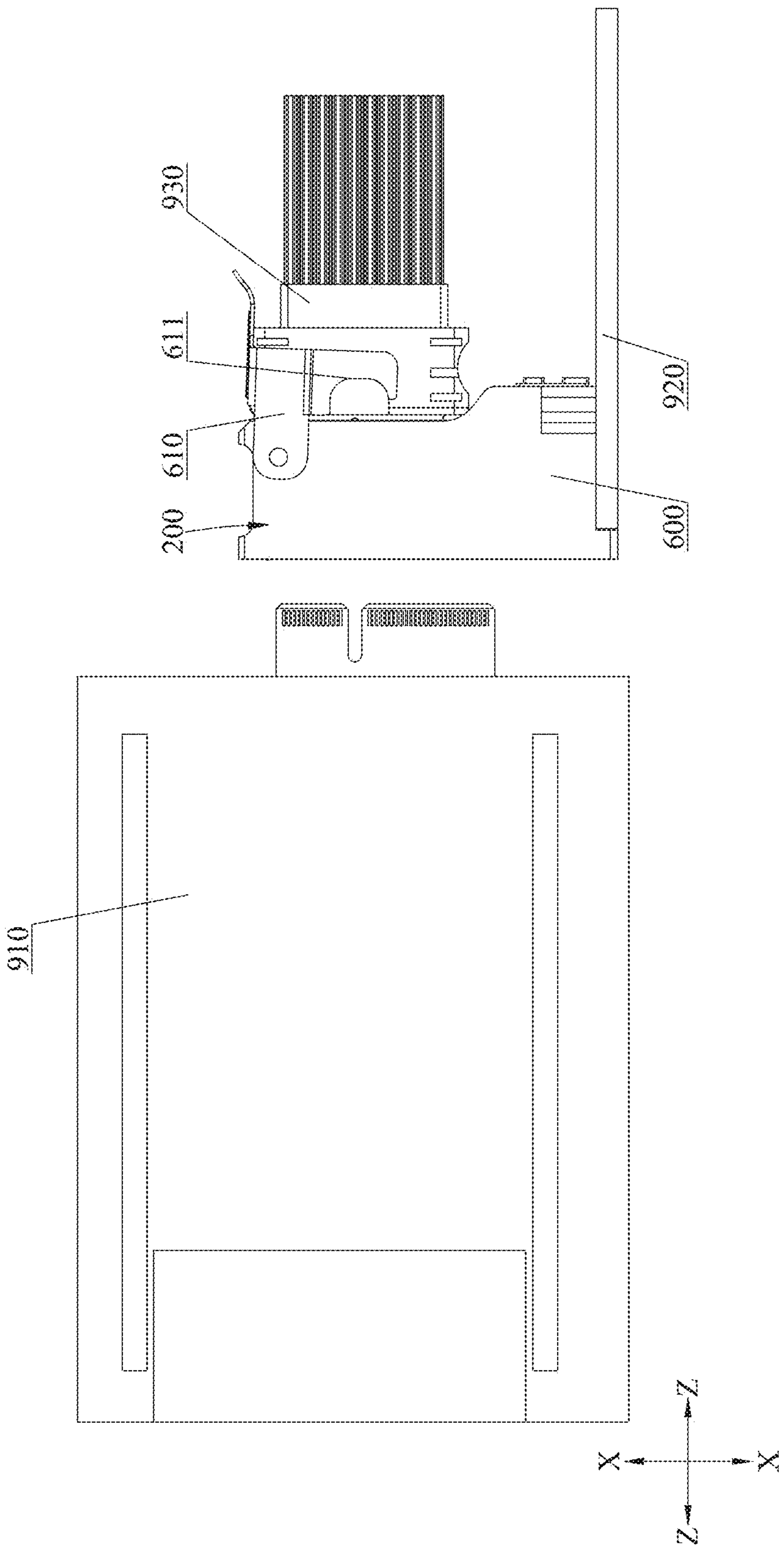
FIG. 2B is a side view of the electronic system of FIG. 2A, showing the electrical connector connected to the printed circuit board and the cable component.

FIGS. 2A-2B show one of the groups of add-in cards and electrical connectors, and a portion of a printed circuit board in FIG. 1A, prior to inserting the add-in card into the electrical connector. The add-in card 910 may be any one of add-in cards 120*a* . . . 120*d*. The electrical connector 200 may be one of the electrical connectors 110*a* . . . 110*d* corresponding to the preceding add-in card. The printed circuit board 920 may be a portion of a printed circuit board 101. Although one group formed by the add-in card 910 and the electrical connector 200 may have a different structure and function from the other groups, with respect to the improvements provided by the present disclosure, the electrical connectors in different groups may be similar.

As shown in FIGS. 2A-2B, 3A-3E and 4, the electrical connector 10 may comprise an insulating housing 300 and conductive elements 400. The insulating housing 300 may be molded with an insulative material, such as a plastic. Various types of plastics may be used such as, but not limited to, liquid crystal polymers (LCP), polyphenylene sulfite (PPS), high-temperature nylon or poly-p-phenylene oxide (PPO), or polypropylene (PP). In some cases, the plastic may be a thermoset plastic. In some cases, the insulative plastic may include insulative reinforcing material such as glass fibers. The insulating housing 300 may generally be a one-piece member.

A longitudinal direction X-X, a transverse direction Y-Y and a vertical direction Z-Z are shown in the drawings. The longitudinal directions X-X, the transverse direction Y-Y and the vertical direction Z-Z may be perpendicular to each other. The vertical direction Z-Z may generally refer to a height direction of the electrical connector. The longitudinal direction X-X may generally refer to a length direction of the electrical connector. The transverse direction Y-Y may generally refer to a width direction of the electrical connector.

The insulating housing 300 may comprise a first slot 301. The add-in card 910 may be inserted into the first slot 301 of the insulating housing 300 in the vertical direction Z-Z.

In some examples, the first slot 301 may elongate in a direction (e.g., a longitudinal direction X-X) perpendicular to a mating direction (e.g., the vertical direction Z-Z). For example, the first slot 301 may have an opening **301*a* that may extend in the longitudinal direction X-X. The first slot 301 may be recessed inwardly from the opening 301*a* in the vertical direction Z-Z so as for receiving the edge of the add-in card 910. The edge of the add-in card 910 may be inserted into the first slot 301**.

Figure 5A:
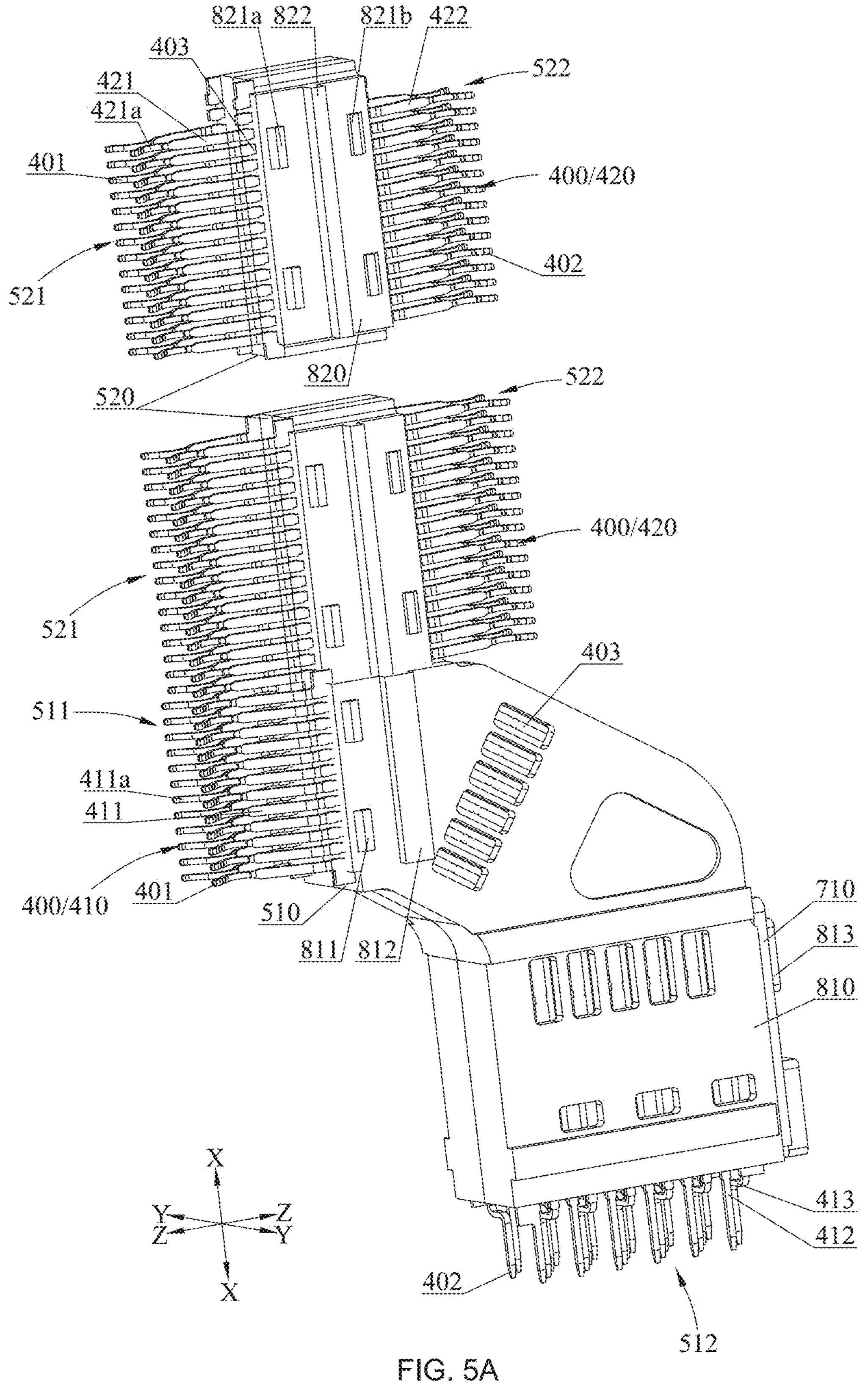
FIG. 5A is a perspective view of board mount wafers and pass through wafers of the electrical connector of FIG. 4.

The conductive elements 400 may be directly or indirectly held in the insulating housing 300. The conductive elements 400 may be spaced apart from each other to ensure that adjacent conductive elements 400 are electrically insulated from each other. The conductive elements 400 may be made of an electrically conductive material, such as metal. The conductive elements 400 each may usually be an elongated one-piece member. The conductive elements 400 may extend into the first slot 301. In some examples, each of the conductive elements 400 may include a mating end 401 at its front end, a mounting end 402 at its rear end, and an intermediate portion 403 connected between the mating end 401 and the mounting end 402, as shown in FIG. 5A. The mating end 401 may be accommodated in the insulating housing 300. The mating end 401 may be on a side of the first slot 301. For example, the mating end 401 may be bent and protruded into the first slot 301.

Conductive elements 400 may comprise a first plurality of conductive elements 410 and a second plurality of conductive elements 420. The first plurality of conductive elements 410 and the second plurality of conductive elements 420 are different types of conductors. The first plurality of conductive elements 410 may include low-speed signal conductive elements. The first plurality of conductive elements 410 may carry low-frequency signals (e.g., frequencies less than 500 MHz), lower data-rate signals (e.g., less than 100 Mb/s), logic control signals and so on. Optionally, the first plurality of conductive elements 410 may comprise one or more additional conductive elements for carrying bias potential, or a reference potential. The additional conductive elements may include a common conductor, which may have more than one mounting tail and more than one mating contact portions. The common conductor may act as a power conductor. Additionally or alternatively, the common conductor may carry other high current and low frequency signal. The second plurality of conductive elements 420 may include high-speed signal conductive elements. The high-speed signal conductive elements are used for transmitting differential signals, thus may serve as differential signal conductor pairs. The second plurality of conductive elements 420 may further include ground conductors for separating the differential signal conductor pairs. Optionally, the second plurality of conductive elements 420 may also include additional conductors and/or common conductors as mentioned above. The first plurality of conductive elements 410 and the second plurality of conductive elements 420, in addition to being used for transmitting different signals, may differ in terms of shape, since they can form different mating interfaces, which will be described in more detail below.

Figure 6B:
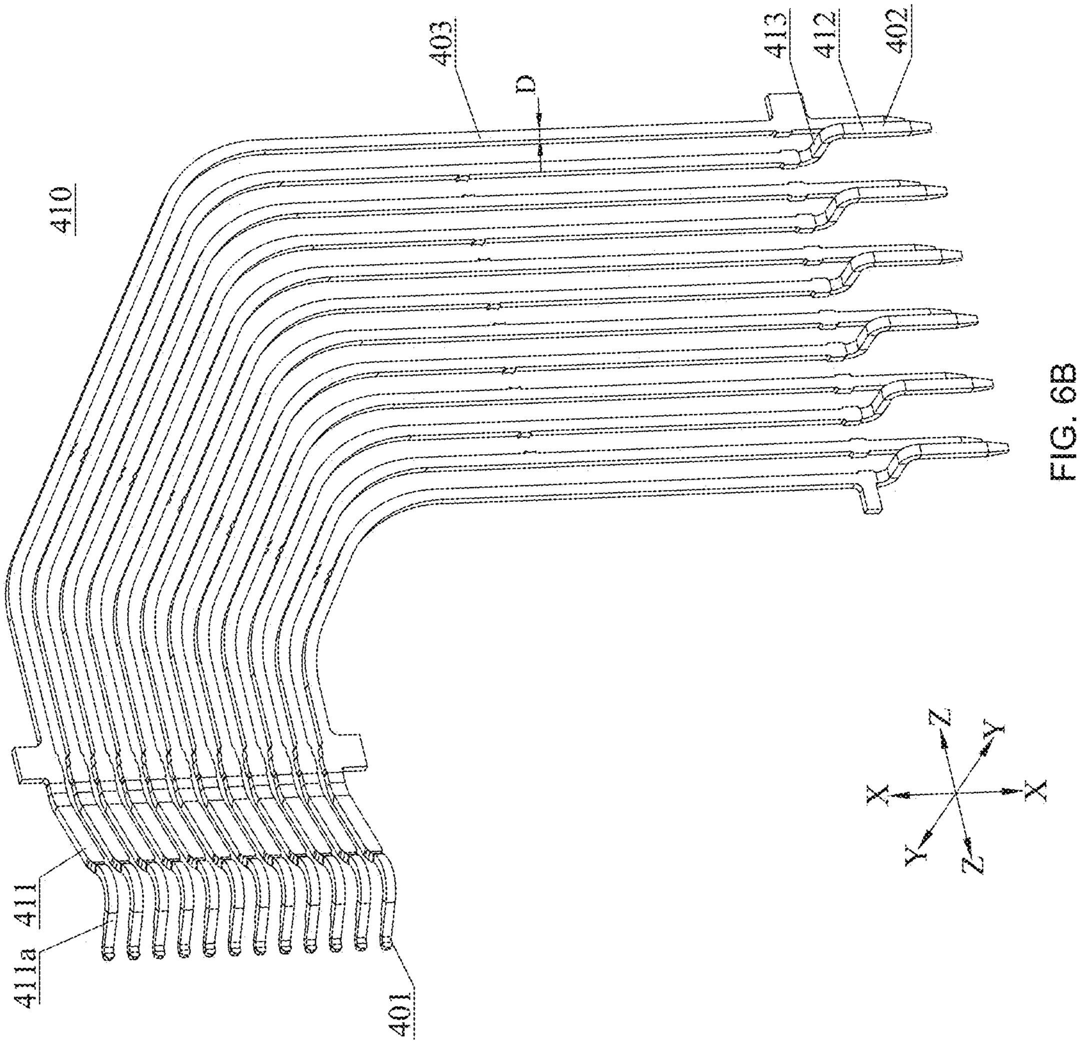
FIG. 6B is a perspective view of a first plurality of conductive elements of the first wafer of FIG. 6A, with the wafer housing cut away.
Figure 6C:
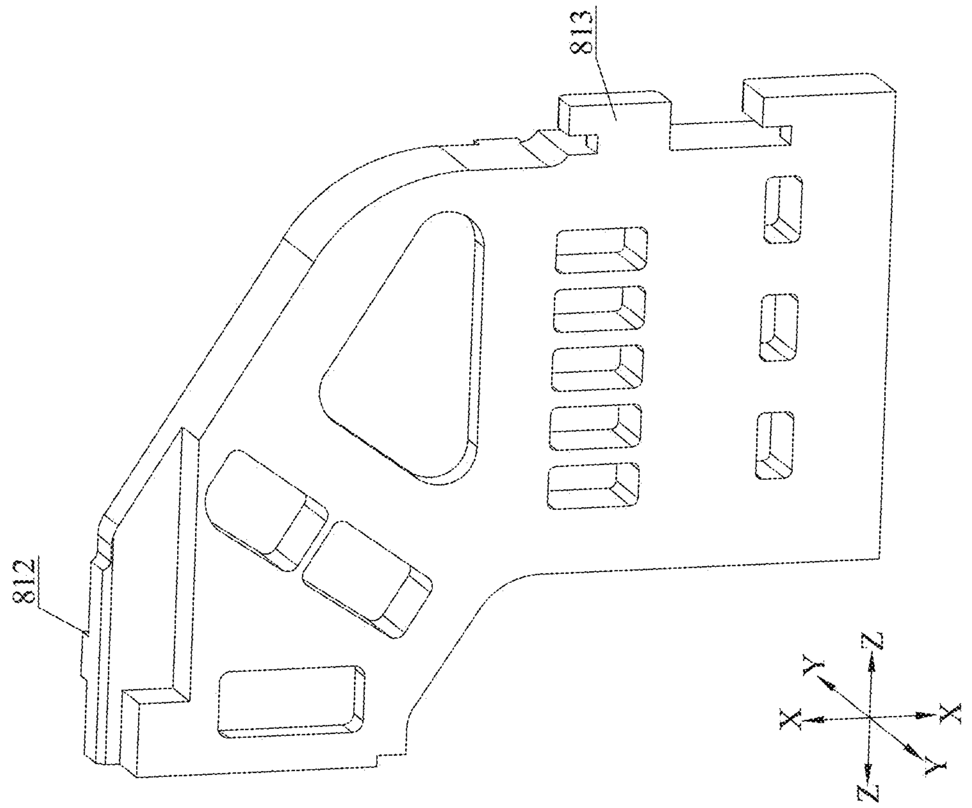
FIG. 6C is a perspective view of a first wafer housing of the board mount wafer of FIG. 6A, with conductive elements hidden.

FIG. 6B shows an exemplary embodiment of the first plurality of conductive elements 410. As shown in FIG. 6B, each of the first plurality of conductive elements 410 may include a mating end 401, a mounting end 402, and an intermediate portion 403 connected between the mating end 401 and the mounting end 402. As shown in the illustrated example, the mating ends 401 and the mounting ends 402 of the first plurality of conductive elements 410 extend in directions perpendicular to each other, respectively. The intermediate portions 403 of the first plurality of conductive elements 410 are L-shaped.

Figure 7B:
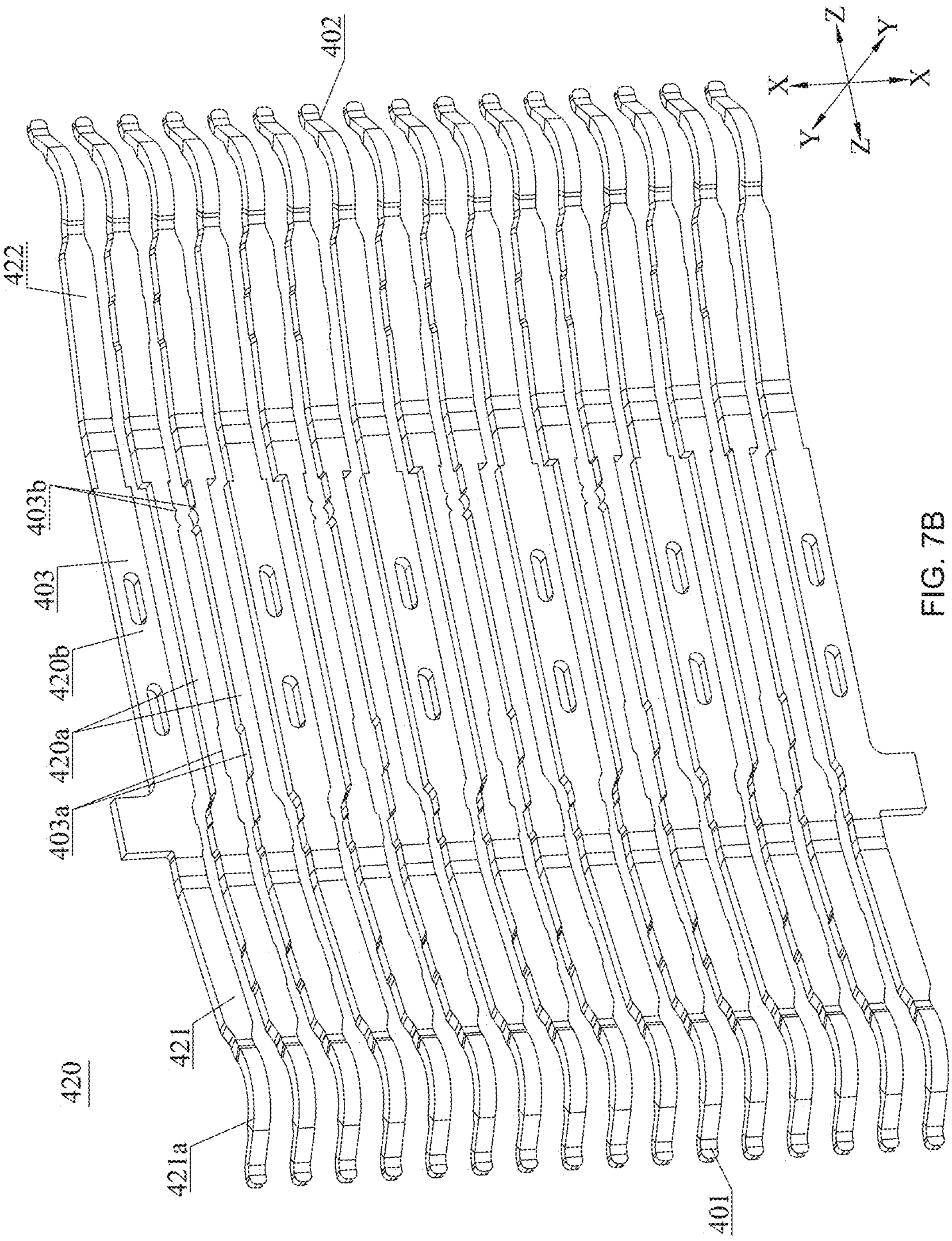
FIG. 7B is a perspective view of a second plurality of conductive elements of the second wafer of FIG. 7A.
Figure 7C:
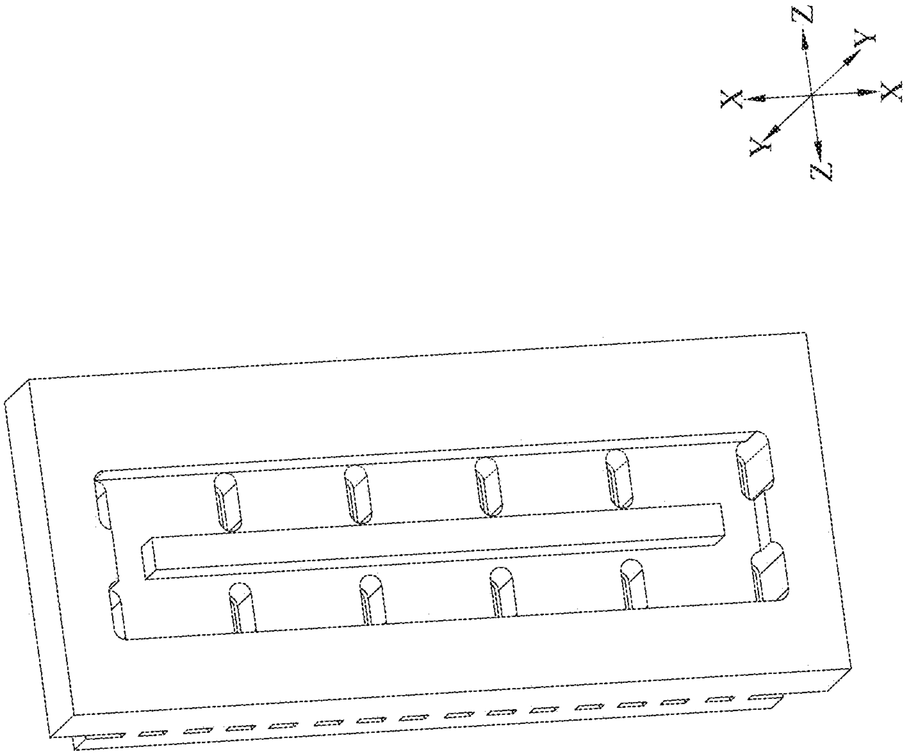
FIG. 7C is a perspective view of a second wafer housing of the pass through wafer of FIG. 7A.
Figure 8A:
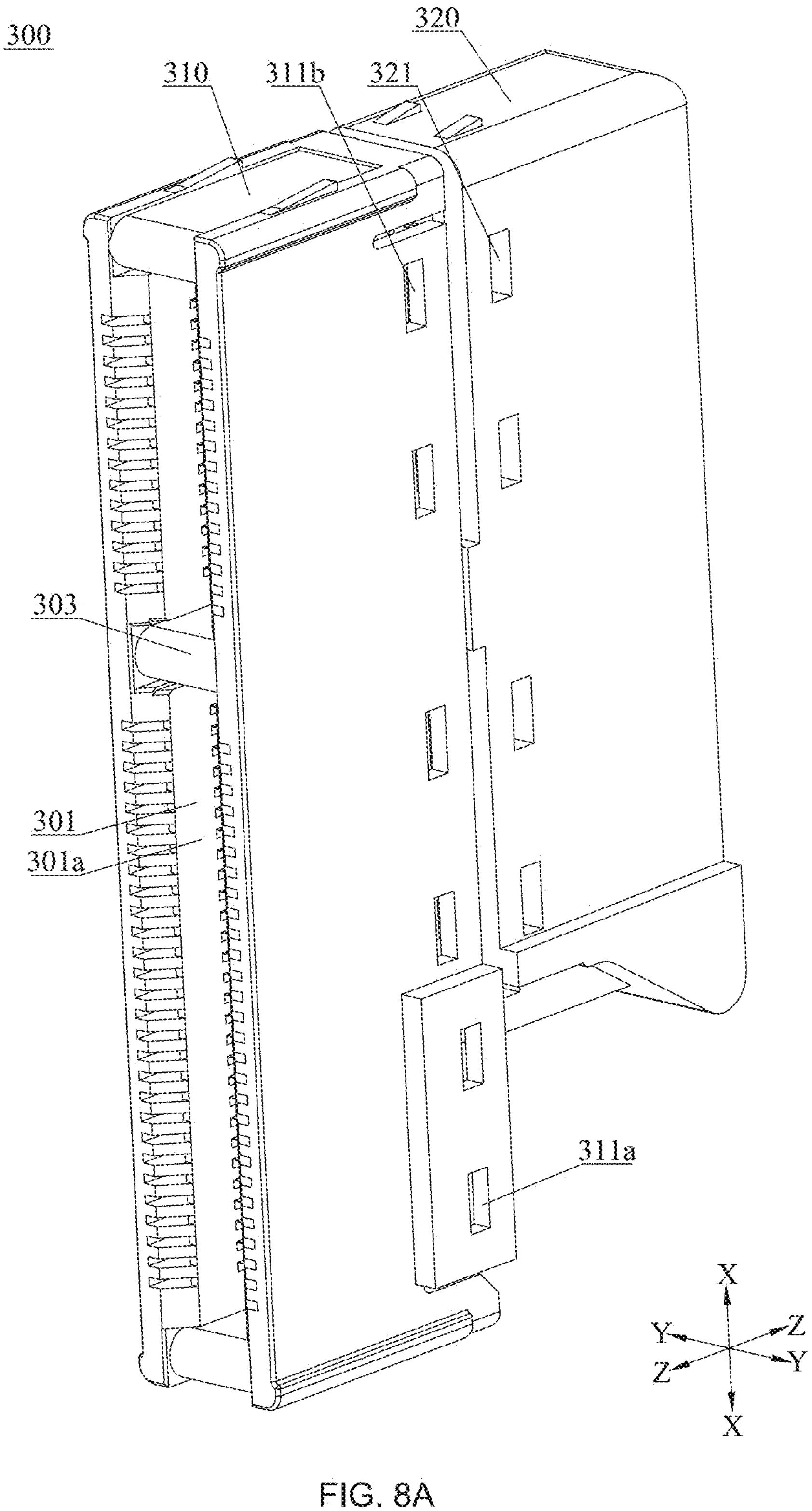
FIG. 8A is a perspective view of an insulating housing of the electrical connector of FIG. 4.
Figure 8B:
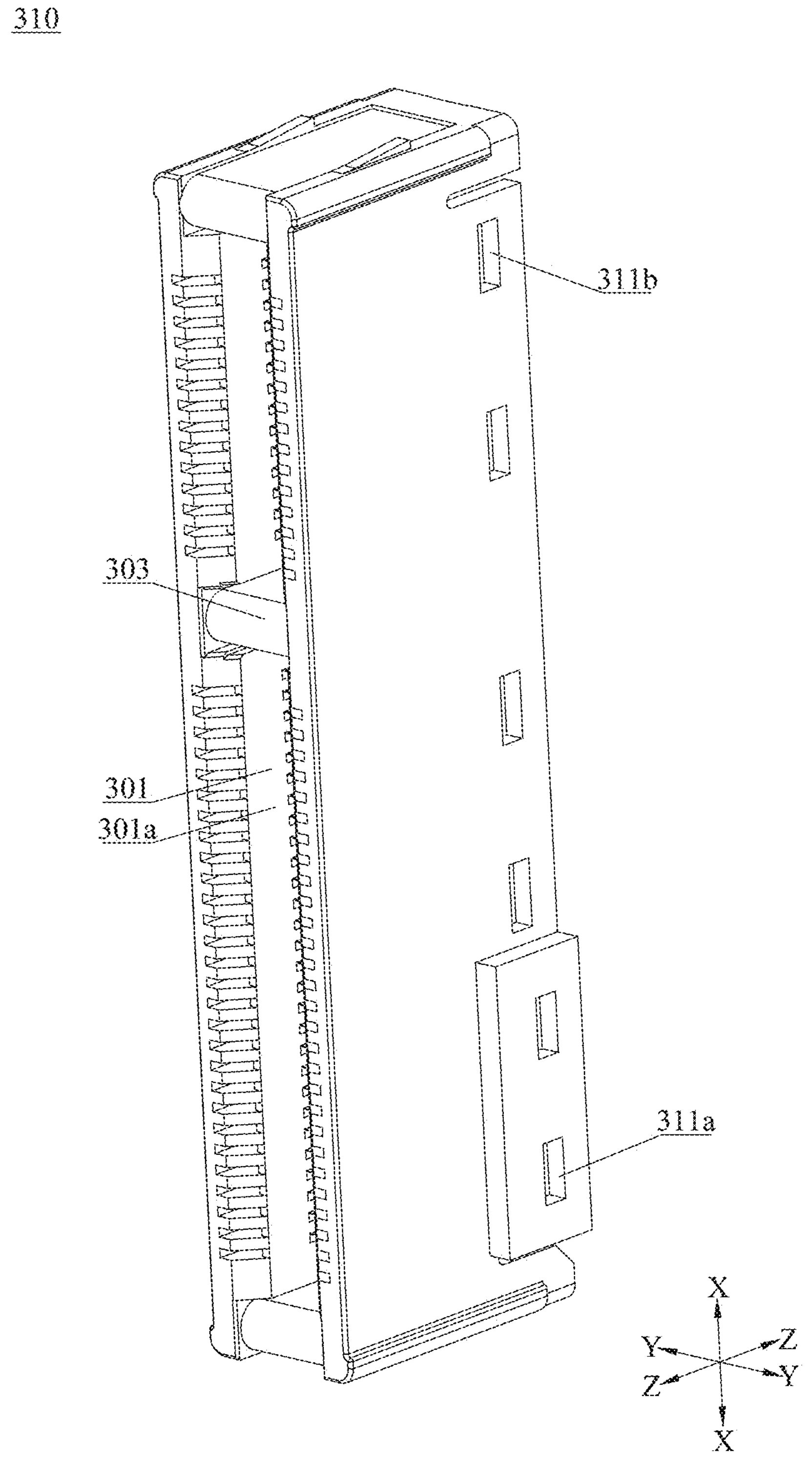
FIG. 8B is a perspective view of a first insulating housing of the insulating housing of FIG. 8A.
Figure 8C:
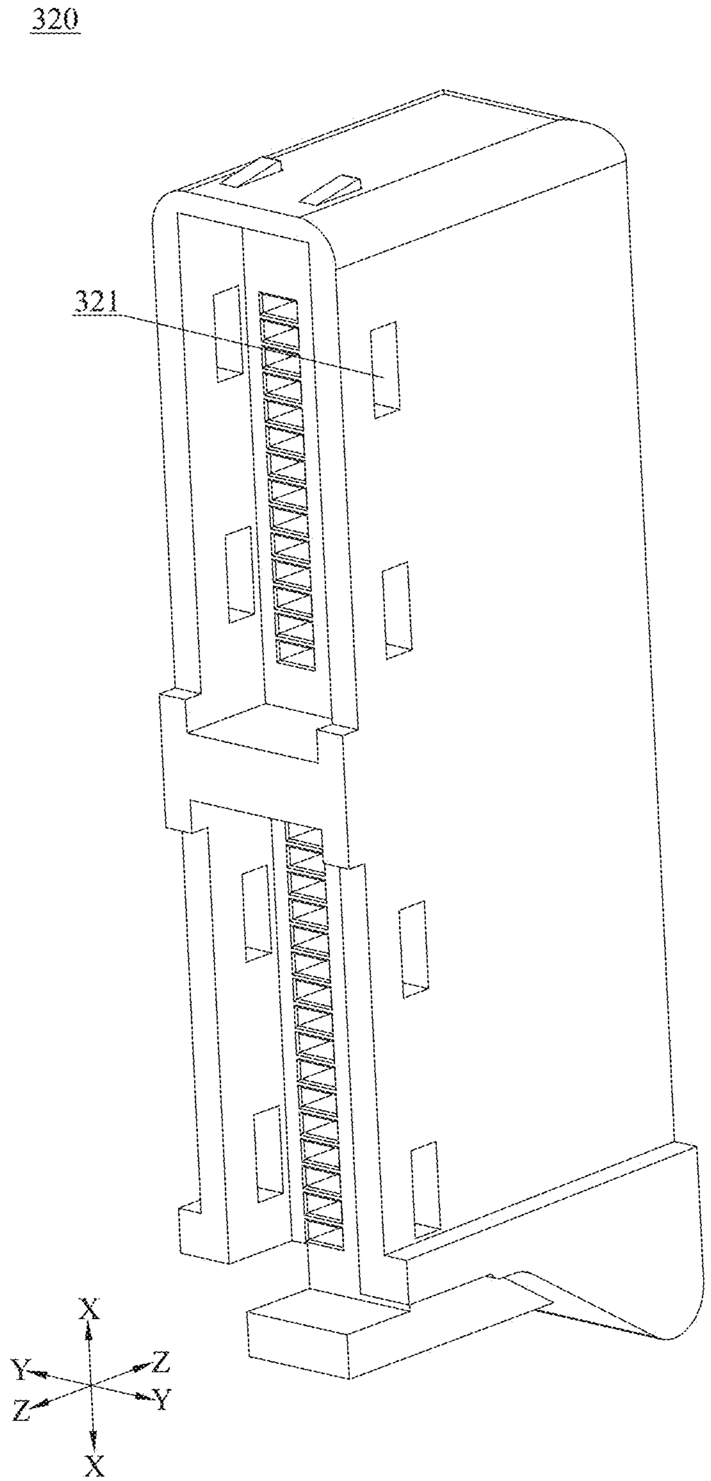
FIG. 8C is a perspective view of a second insulating housing of the insulating housing of FIG. 8A.

FIG. 7B shows an exemplary embodiment of the second plurality of conductive elements 420. As shown in FIG. 7B, each of the second plurality of conductive elements 420 may include a mating end 401, a mounting end 402, and an intermediate portion 403 connected between the mating end 401 and the mounting end 402. As shown in the illustrated example, the mating ends 401 and the mounting ends 402 of the second plurality of conductive elements 420 extend in opposite directions, respectively. The intermediate portions 403 of the second plurality of conductive elements 420 are generally linear.

Figure 4:
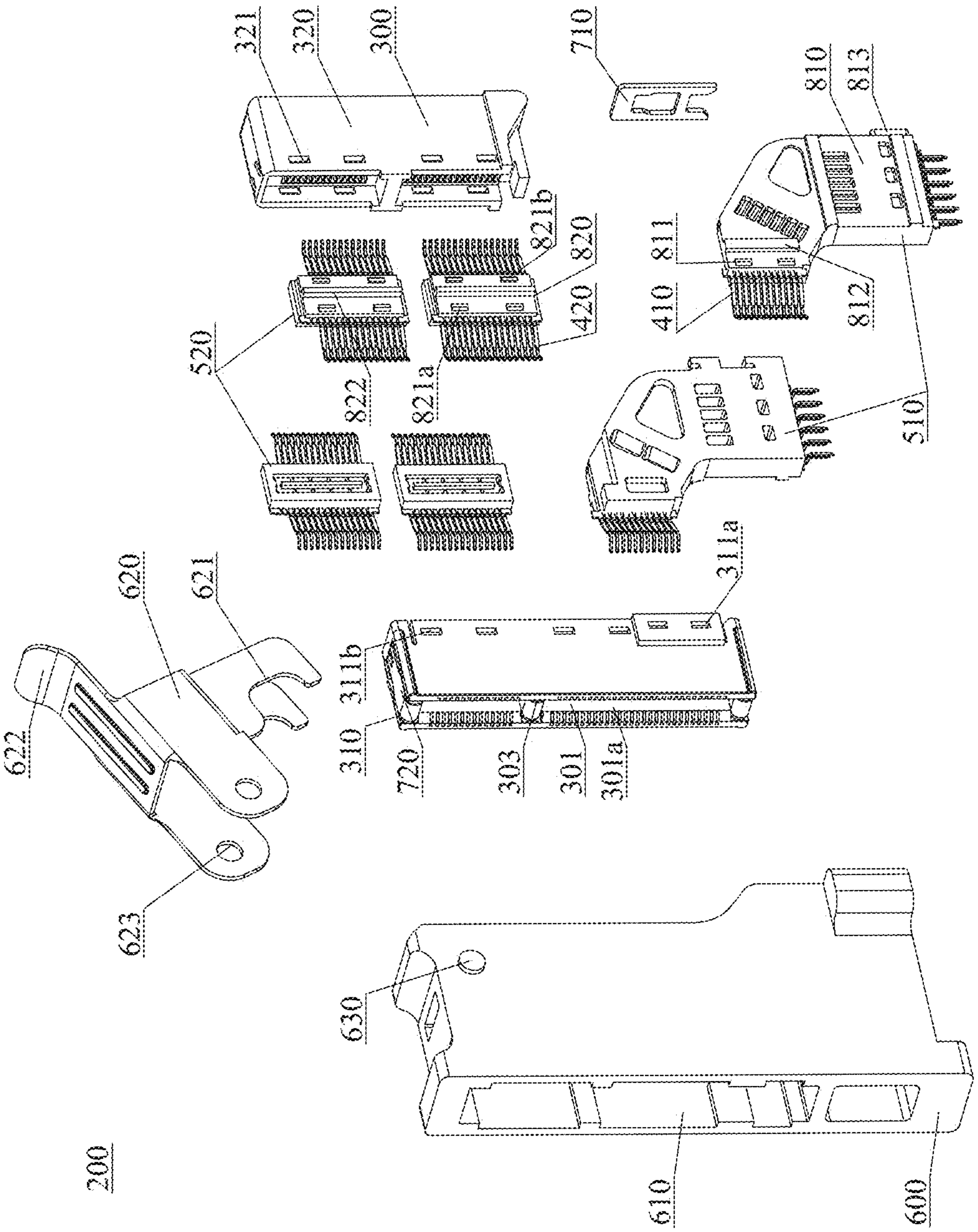
FIG. 4 is a partially exploded view of the electrical connector of FIG. 3A.

The conductive elements 400 may be arranged in two rows on opposite sides of the first slot 301. For each row of the conductive elements 400, the mating ends 401 of the conductive elements 400 may be arranged in a first column. The first column may extend in the longitudinal direction X-X. In the embodiment as shown in FIGS. 4 and 5A, the mating ends 401 of the conductive elements 400 may be arranged on the opposite sides of the first slot 301 in two columns spaced apart in a transverse direction Y-Y. After inserting the add-in card 910 into the first slot 301, the two columns of mating ends 401 may be in electrical contact with contact pads on respective sides of the add-in card 910. Optionally, the two columns of mating ends 401 may be aligned with each other in the longitudinal direction X-X. Optionally, the two columns of mating ends 401 are staggered in the longitudinal direction X-X to increase the space between the conductive elements 400, thereby reducing crosstalk. Optionally, the conductive elements 400 may be disposed on one side of the first slot 301, and in this case the first column has a quantity of one. Each first column may comprise both conductive elements 410 and conductive elements 420. The conductive elements 410 may be in a first portion of the first column and the conductive elements 420 may be in a second portion of the first column. These two portions may be arranged spaced apart in the longitudinal direction X-X. Optionally, these two portions may also be arranged in close proximity to each other in the longitudinal direction X-X, i.e., the pitch P1 of the first plurality of conductive elements 410 may be substantially equal to the distance between the first plurality of conductive elements 410 and the second plurality of conductive elements 420. The pitch P1 of the first plurality of conductive elements 410 may be equal to the pitch P2 of the second plurality of conductive elements 420. Optionally, P1 and P2 may be unequal. The conductive elements 410 on one side of the first slot 301 may be aligned to the conductive elements 410 on the other side of the first slot 301, or they may be staggered by one-half of P1. Similarly, the conductive elements 420 on one side of the first slot 301 may be aligned to the conductive elements 420 on the other side of the first slot 301, or they may be staggered by one-half of P2. Optionally, the first portions where the first plurality of conductive elements 410 are and the second portions where the second plurality of conductive elements 420 are may also be arranged alternately or in any other suitable manner. It should be appreciated that the present disclosure may not intend to be limited in terms of the arrangement of the first and second portions. One or more second portions may be aligned in the first column. Multiple second portions may be arranged sequentially in the longitudinal direction X-X without being separated by any other conductive element. The conductive elements 420 in individual portions may be held by individual wafer housings to form individual second wafers 520. The conductive elements 410 may be held by individual wafer housings to form first wafers 510. The first wafers 510 and the second wafers 520 will be described in more detail below. As shown in the illustrated example in FIGS. 5A-5B, the second plurality of conductive elements 420 are disposed in two second portions. The two second portions may be spaced apart, i.e., the space between the two second portions may be significantly larger than P2. A rib 303 may be provided in the space. The rib 303 disposed in the first slot 301 may divide the first slot 301 into two portions. The two portions may be of unequal lengths, which may serve as a dummy-proof effect. Two ends of the rib 303 may be connected to two sidewalls of the first slot 301, respectively, which may enhance the strength of the insulating housing 300. The number of conductive elements 420 included in individual second sections may be equal or unequal.

Figure 5B:
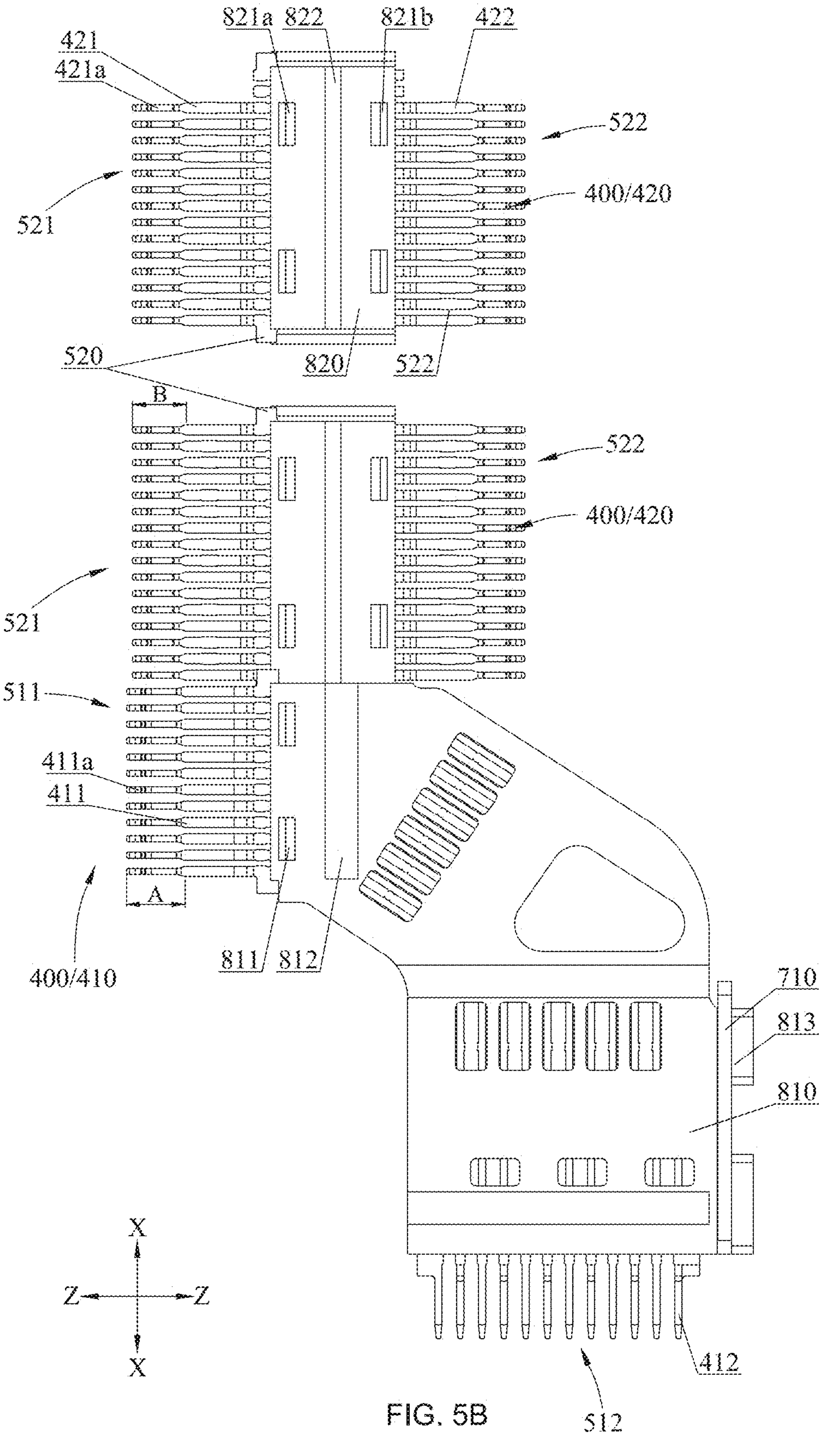
FIG. 5B is a side view of the first and second wafers of FIG. 5A.
Figure 5C:
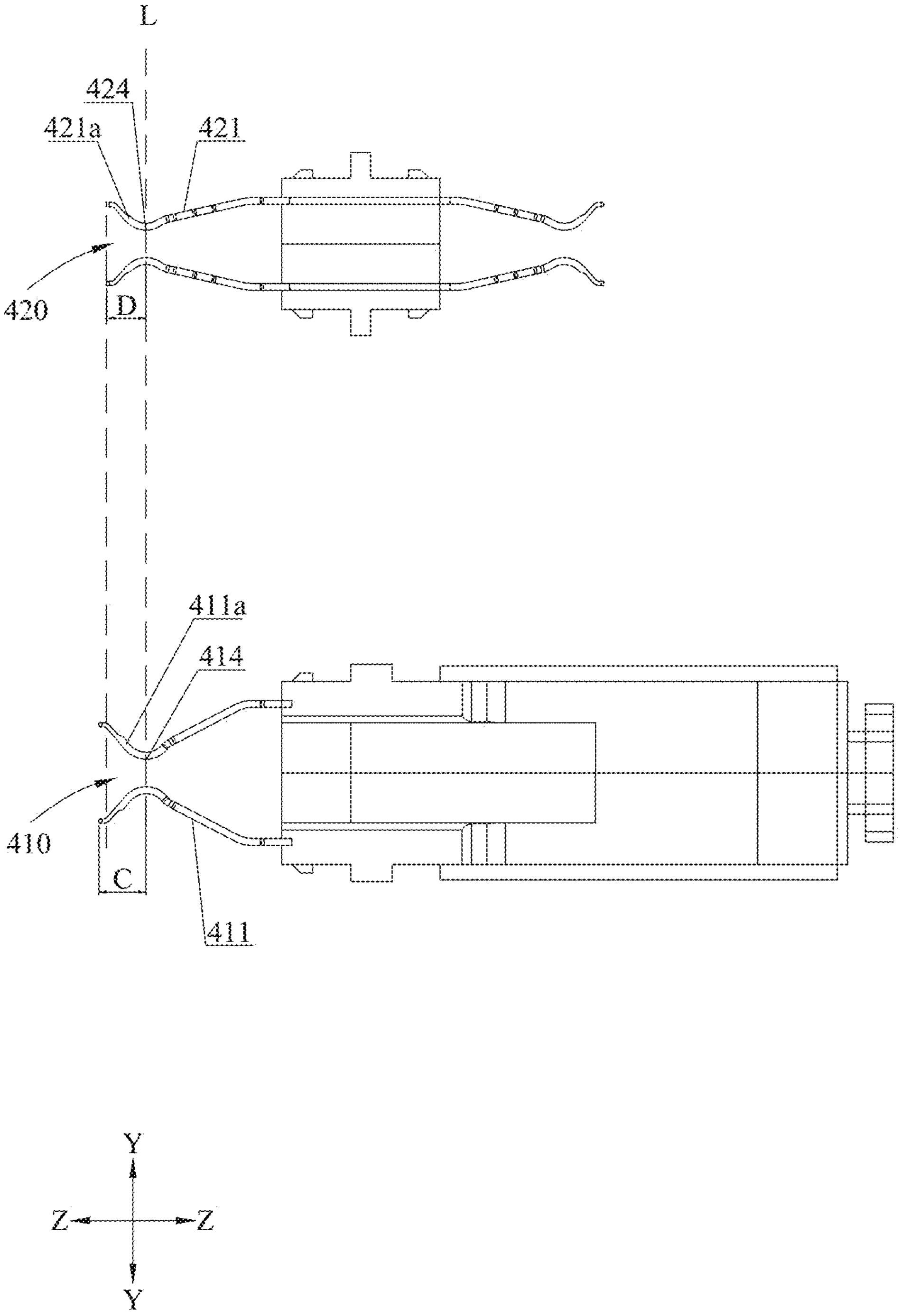
FIG. 5C is a top view of a board mount wafer and a pass through wafer of FIG. 5A positioned side by side with their mating interfaces aligned.

As shown in FIG. 5B, for each of the conductive elements 400 including the first plurality of conductive elements 410 or the second plurality of conductive elements 420, the mating end 401 may include a thicker portion in close proximity to the intermediate portion 403 and a thinner portion away from the intermediate portion 403. The thinner portion may include a mating contact portion configured to be in electrical contact with the add-in card 910 inserted into the first slot 301 of the electrical connector 200. As shown in FIG. 5C, the mating end 411 of each of the first plurality of conductive elements 410 has a mating contact portion 414, and the mating end 421 of each of the second plurality of conductive elements 420 has a mating contact portion 424. The mating contact portions 414 and 424 may both curve into the first slot 301. In order to reduce contact resistance, films of precious metal material may be formed on the thinner portions where the mating contact portions 414 or 424 are, such that the costs are reduced. In combination with FIG. 5B, the thinner portions of the mating ends 401 of the first plurality of conductive elements 410 are identified as A, and the mating contact portions 414 are formed on the portions A. The thinner portions of the mating ends 401 of the second plurality of conductive elements 420 are identified as B, and the mating contact portions 424 are formed at the portions B. Similarly, for each of the conductive elements 400 including the first plurality of conductive elements 410 or the second plurality of conductive elements 420, the mounting end 402 may also include a thicker portion in close proximity to the intermediate portion 403 and a thinner portion away from the intermediate portion 403. The surface of the thinner portion may be formed with a film of a precious metal material to reduce the contact resistance with the mated electrical device.

For each of the first plurality of conductive elements 410, the mating end 411 may include a tip 411*a* extending from the mating contact portion 414 to the tip of the mating end 411, which is labeled C in FIG. 5C. For each of the second plurality of conductive elements 420, the mating end 421 may include a tip 421*a* extending from the mating contact portion 424 to the tip of the mating end 421, which is labeled D in FIG. 5C. The mating contact portions 414 of the first plurality of conductive elements 410 and the mating contact portions 424 of the second plurality of conductive elements 420 may be aligned in a straight line L. The straight line L may extend in the longitudinal direction X-X. For example, the straight line L is parallel to the first column. In this way, in the case where the lengths of the contact pads on the add-in card 910 that are in electrical contact with the first plurality of conductive elements 410 and the second plurality of conductive elements 420 are consistent, the mating contact portions 414 and 424 may provide a consistent wiping distance on the contact pads on the add-in card 910. Exemplarily, the length of the tip 411*a* may be greater than that of the tip 421*a*. With this configuration, the second plurality of conductive elements 420 have smaller stub resonance such that they can be used to transmit high-speed signals and signal integrity (SI) is improved. In this way, the electrical connector 200 is able to operate at higher frequencies while satisfying the dimension requirements of relevant industry standards.

Figure 3A:
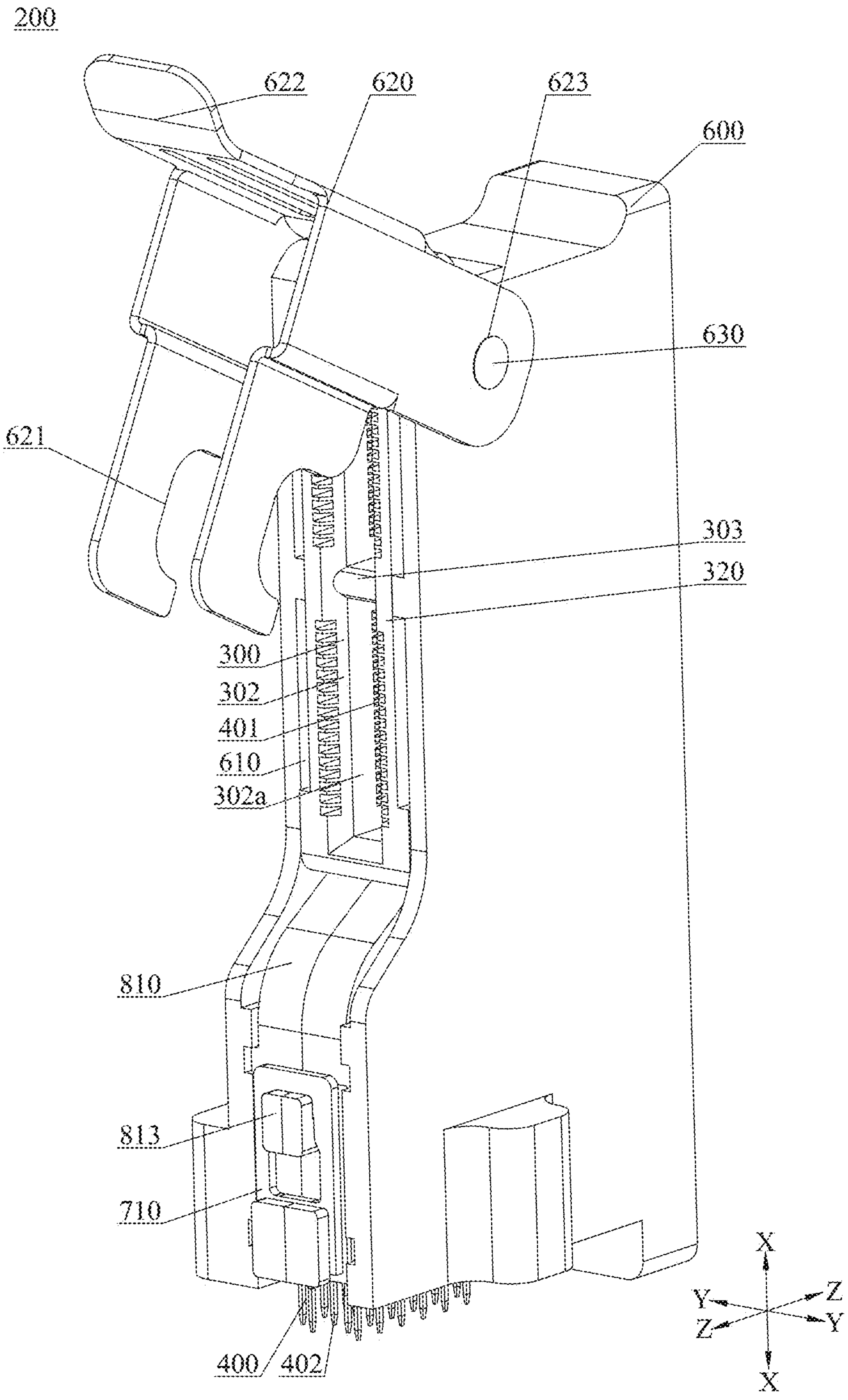
FIG. 3A is a rear, side perspective view of the electrical connector of the electronic system of FIG. 2A.

The mounting ends 412 of the first plurality of conductive elements 410 may be arranged in one or more rows, as shown in FIGS. 5A and 3A. For the conductive elements 410 on one side of the first slot 301, the mounting ends 412 may be arranged in one or more rows, including but not limited to the two rows as shown in the drawings, for example, three, four or more rows. The one or more rows may be perpendicular to the first column. For example, the one or more rows may extend in vertical direction Z-Z. In this way, the conductive elements 410 may be substantially L-shaped. The mounting ends 412 may extend beyond the insulating housing 300. The mounting ends 412 may be used to be electrically connected to other device. In some embodiments, the mounting ends 412 of the conductive elements 410 may be configured to be mounted to the printed circuit board 920. The conductive elements 410 may provide the interconnection between the add-in card 910 and the circuits in the printed circuit board 920.

In the case where the mounting ends 412 of the conductive elements 410 on each side of the first slot 301 are arranged in two or more rows, it is possible to increase the distance between two adjacent mounting ends 412, which, in turn, permits an increase in the space between soldering pads on the printed circuit board 920 to which the mounting ends 412 be connected. Alternatively, in the case where the space between the soldering pads on the printed circuit board 920 is given, the mounting ends 412 of each row of conductive elements 410 arranged in a plurality of rows may occupy a smaller peripheral region that extends a relatively small distance from the edge of the PCB, and the electrical connector 200 may become more compact.

The mounting end 412 of each conductive element 410 may be mounted to the printed circuit board 920 by technologies such as Surface Mounted Technology (SMT) and/or Through-Hole Technology (THT), thereby achieving an electrical connection to the circuits of the printed circuit board 920. Depending on the mounting technology, the mounting ends 412 may include through-hole pins, SMT ends, or press-fit pins and so on. For example, the mounting ends 412 may be inserted into through-holes in the printed circuit board 920 and form an electrical connection with the soldering pads on the printed circuit board 920. In some embodiments, the mounting ends 412 may be shaped as press-fit flexible portions. The peripheral region of the printed circuit board 920 may be provided with conductive through-holes in a pattern that may correspond to the arrangement of the mounting ends 412 of the electrical connector 200 to be connected. Optionally, the sidewall of each conductive through-hole may be plated with a metal conductive layer. The mounting ends 412 may be inserted into the corresponding conductive through-holes to be in electrical contact with the metal conductive layers. The metal conductive layers of these conductive through-holes may be electrically connected to different conductive traces in the printed circuit board to form desired circuits. It should be appreciated that the present disclosure may not intend to be limited in terms of methods for interconnecting the mounting ends 412 to the printed circuit board 920.

In some embodiments, the conductive elements 410 may comprise bends 413 as shown in FIGS. 5A and 6A-6B. The bends 413 may enable the mounting ends 412 to be disposed in two rows. Exemplarily, some of the conductive elements 410 may be provided with the bends 413. For example, the bends 413 may be provided every other conductive element 410, and the bends 413 may be disposed between the intermediate portions 403 and the mounting ends 412. The bends 413 may curve toward a direction perpendicular to the rows, e.g., in the transverse direction Y-Y. Optionally, the bends 413 may also curve toward any suitable direction. The extension direction of at least some of the conductive elements 410 can be changed by the bends 413, thereby forming two rows. Optionally, it is also possible to provide the bends 413 on all of the conductive elements 410. In this case, adjacent two bends may curve toward different directions, for example toward opposite directions. The bends may be perpendicular to or at other angles to the direction parallel to the rows.

The mounting ends 422 of the conductive elements 420 may be arranged in a second column. The second column may be parallel to the first column. For example, the second column may extend in the longitudinal direction X-X. In this way, the conductive elements 420 may be substantially linear as shown in FIG. 7B. In some embodiments, the mounting ends 422 of the conductive elements 420 may be configured to mate with a cable component 930. The mounting ends 422 of the conductive elements 420 can be electrically connected with the cable component 930 by any suitable manner, including but not limited to, soldering, gluing or insertion. In some examples, one end of the cable component 930 may mate with the mounting ends 422 of the conductive elements 420. The other end of the cable component 930 may be provided with cables. The cables may be used for electrical connection with another electrical device. The conductive elements 420 may provide the interconnection of the add-in card 910 to the electrical device at a remote location via the cable component 930.

Exemplarily, as shown in FIG. 3A, the insulating housing 300 may further comprise a second slot 302. The cable component 930 may mate with the second slot 302 of the insulating housing 300 in the vertical direction Z-Z. In some examples, the second slot 302 may elongate in a direction perpendicular to the mating direction (i.e., the vertical direction Z-Z), such as, the longitudinal direction X-X. The second slot 302 may have an opening 302*a* which may extend in the longitudinal direction X-X. The second slot 302 may be recessed inwardly from the opening 302*a* in the vertical direction Z-Z so as for receiving the edge of one end of the cable component 930. The edge of the one end of the cable component 930 may be inserted into the second slot 302.

Figure 3B:
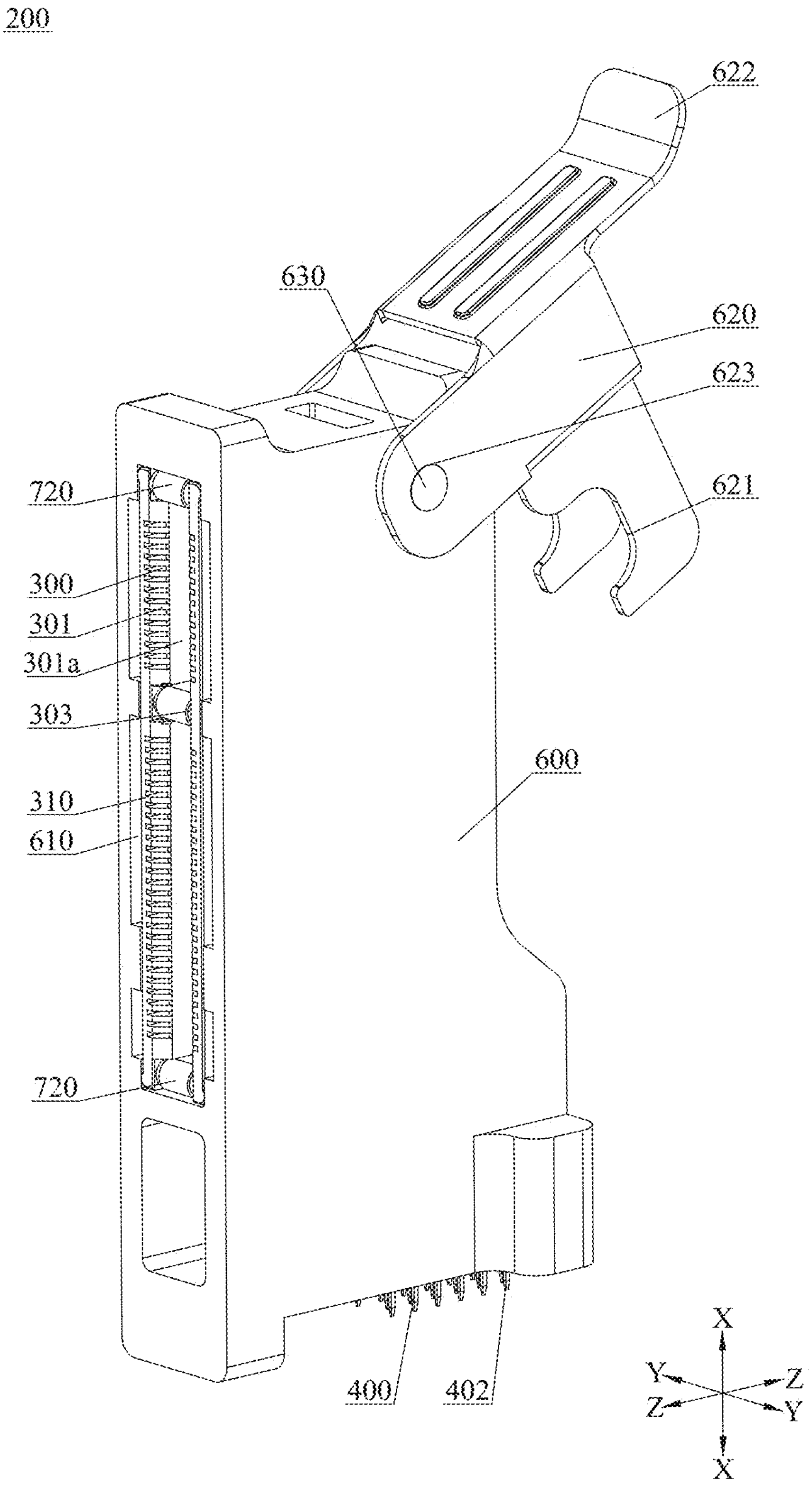
FIG. 3B is a front, side perspective view of the electrical connector of FIG. 3A.
Figure 3C:
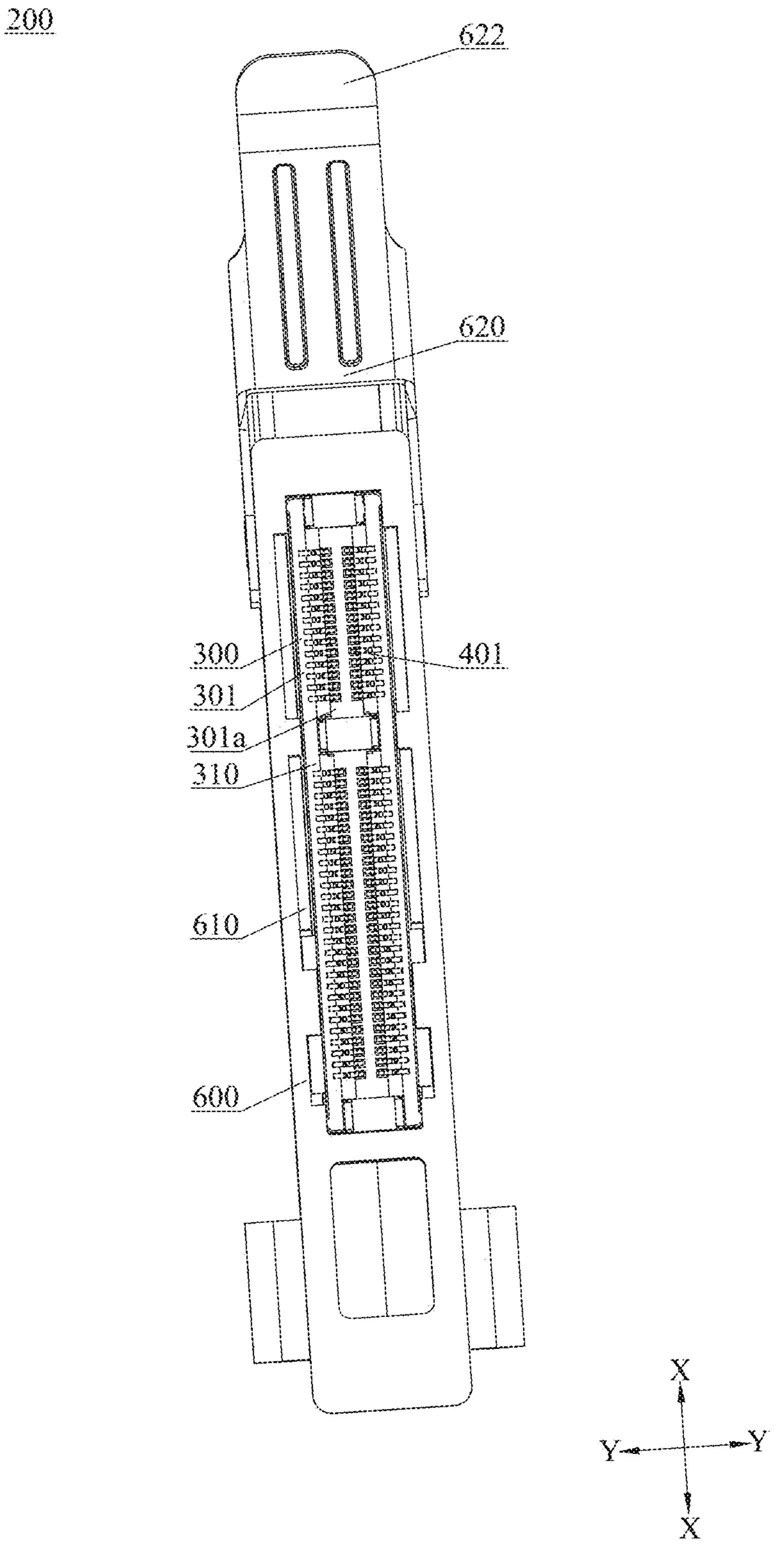
FIG. 3C is a front view of the electrical connector of FIG. 3A.
Figure 3D:
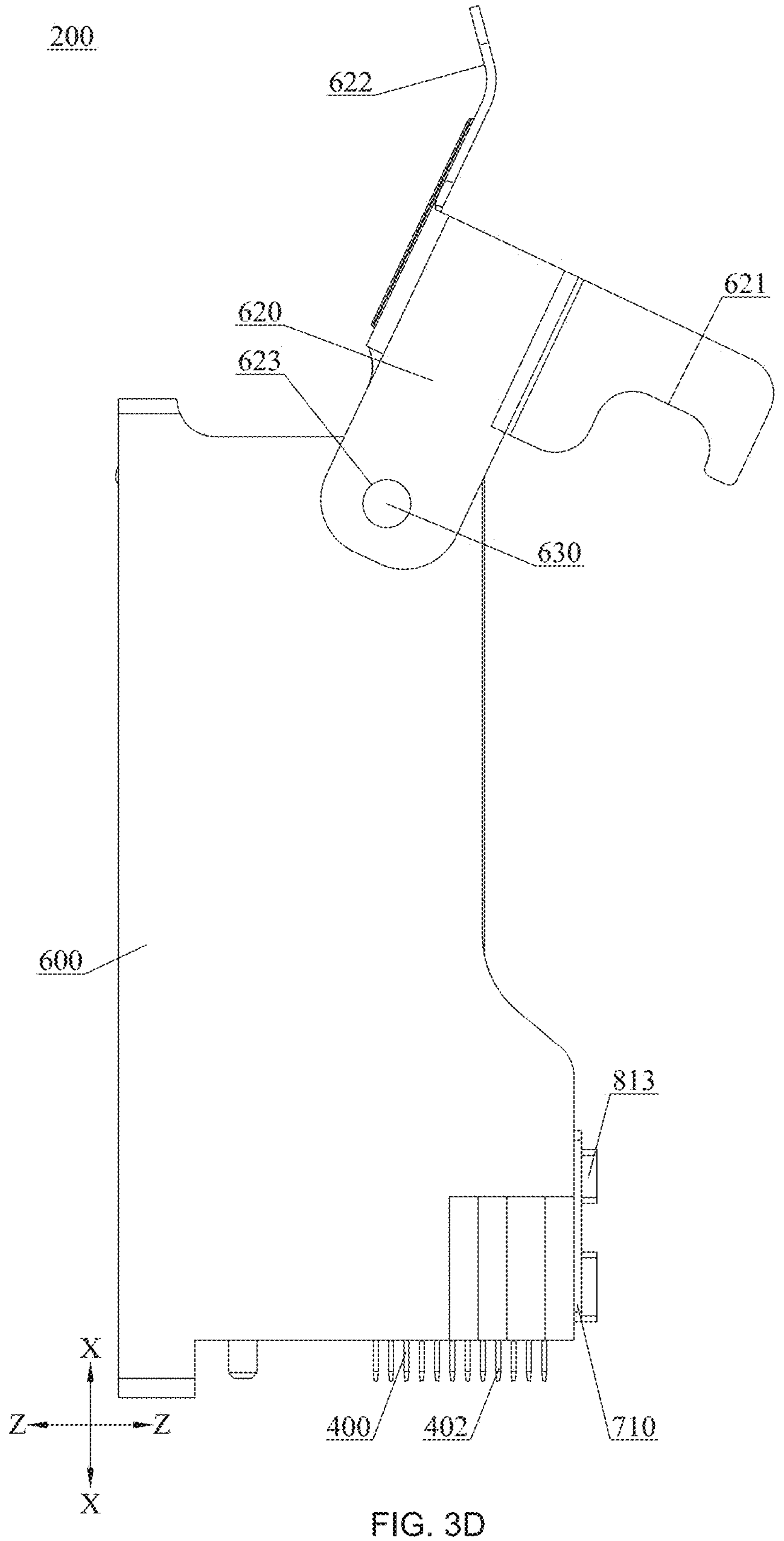
FIG. 3D is a side view of the electrical connector of FIG. 3A.
Figure 3E:
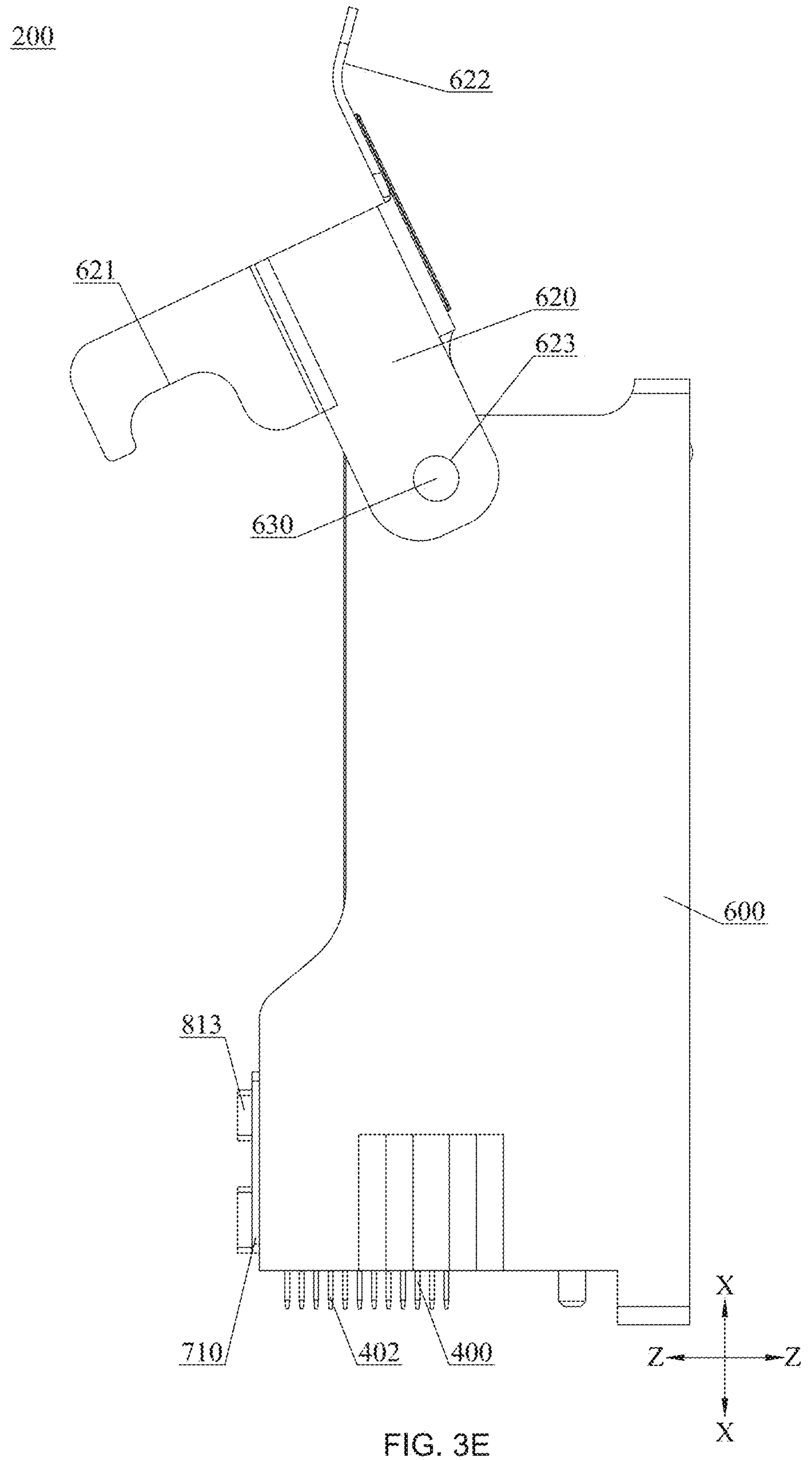
FIG. 3E is another side view of the electrical connector of FIG. 3A.

As shown in FIGS. 3A-3B, the mounting ends 422 of the conductive elements 420 may curve into the second slot 302. The opening 301*a* of the first slot 301 and the opening 302*a* of the second slot 302 may be back to each other in the mating direction. In this way, the conductive elements 420 may be substantially linear, enable their length and consumable material to be reduced, and manufacturing costs to be lowered. Moreover, the signal transmission paths of the conductive elements 420 are shorter and uniform, enable signal integrity to be improved.

As shown in the illustrated example, the mating ends 401 of the conductive elements 400 in the electrical connector 200 are arranged in the first column, and the mounting ends 402 thereof are arranged in the second column and in the rows perpendicular to the first and second columns, such that the mounting ends 412 in the rows and the mounting ends 422 in the second column can be connected to different electrical devices, respectively. For example, the mounting ends 412 may be connected to the printed circuit board 920, while the mounting ends 422 may be connected to the cable component 930. Since a portion of the signals of the electrical connector 200 are provided by the cable component 930, mounting ends connected to the printed circuit board 920 can be reduced in number, and a smaller peripheral region of the printed circuit board 920 may be occupied. In this way, in the case where the dimension of the printed circuit board 920, such as a mid-board, a back-board or a motherboard, is limited, it can be connected to a larger-dimensioned add-in card, or where the dimension of the printed circuit board 920 is not limited, it may provide a larger central region for other electrical connectors or devices. Moreover, since the rows in which the mounting ends 412 are aligned and the column in which the mounting ends 422 are aligned are perpendicular to each other, it reduces the risk for different electrical devices respectively connected to the mounting ends 412 and 422 to interfere with each other.

In some embodiments, the conductive elements 410 may be used to transmit signals at a first speed. The conductive elements 420 may be used to transmit signals at a second speed. The second speed may be greater than the first speed. For example, the conductive elements 410 may include the low-speed signal conductive elements. In this way, the conductive elements 410, the printed circuit board 920 and the other paths for signal transmission may adaptively use materials and/or structures that support low-speed signals so as to reduce manufacturing costs. The conductive elements 420 may include the high-speed signal conductive elements. For example, the conductive elements 420 may be used to transmit high-speed signals. In this way, the high-speed signals can pass directly through the cable component 930. The cable component 930 is better able to improve signal integrity when transmitting high-speed signals, since the conductors in the cable component 930 as compared to the printed circuit board have a smaller density, and fewer restrictions on the manufacturing process, so that the conductors in the cable component 930 have more uniform electrical properties in their extension direction.

The electrical connector 200 itself may also have an economic design. In some embodiments, as shown in FIGS. 5A-5B, the electrical connector 200 may be implemented by wafers. The wafers each may comprise a plurality of conductive elements. In some examples, the wafers may comprise the first wafers 510 and the second wafers 520. The first wafers 510 may include the first plurality of conductive elements 410. The second wafers 520 may include the second plurality of conductive elements 420. The first wafers 510 may include a first mating interface 511 and a first mounting interface 512. The first mating interface 511 and the first mounting interface 512 may be perpendicular to each other. The first mating interface 511 may comprise the mating ends 411 of the conductive elements 410. The first mounting interface 512 may comprise the mounting ends 412 of the conductive elements 410. The second wafers 520 may include the second mating interface 521 and the second mounting interface 522. The second mating interface 521 and the second mounting interface 522 may be parallel to each other. Exemplarily, the second mating interface 521 and the second mounting interface 522 may be oriented to opposite directions, respectively. The second mating interface 521 may include the mating ends 421 of the conductive elements 420. The second mounting interface 522 may include the mounting ends 422 of the conductive elements 420. The first mating interface 511 and the second mating interface 521 may be aligned. The first mating interface 511 and the second mating interface 521 may be disposed on the same side of the electrical connector 200. The first mating interface 511 and the second mating interface 521 may be disposed in the first slot 301 and configured for mating with the add-in card 910. The first mounting interface 512 and the second mounting interface 522 may connect with individual electrical devices. For example, the first mating interface 511 may be mounted on the printed circuit board 920, while the second mating interface 521 may be disposed in the second slot 302 for mating with the cable component 930.

Exemplarily, as shown in FIGS. 5A-5B, 6A-6C, and 7A-7C, the first wafers 510 may include first wafer housings 810 and the second wafers 520 may include second wafer housings 820. The first plurality of conductive elements 410 may be held by the first wafer housings 810. The second plurality of conductive elements 420 may be held by the second wafer housings 820. The first wafer housings 810 and the second wafer housings 820 may be at least partially secured within the insulating housing 300. The first plurality of conductive elements 410 and the second plurality of conductive elements 420 may be held in the insulating housing 300 by the first wafer housings 810 and the second wafer housings 820. Optionally, the first wafer housings 810 and the second wafer housings 820 may also be provided with other conductors besides the first plurality of conductive elements 410 and the second plurality of conductive elements 420.

The first wafer housings 810 and/or the second wafer housings 820 may be molded with an insulative material, such as a plastic. Various types of plastics may be used such as, but not limited to, liquid crystal polymers (LCP), polyphenylene sulfite (PPS), high-temperature nylon or poly-p-phenylene oxide (PPO), or polypropylene (PP). In some cases, the plastic may be a thermoset plastic. In some cases, the insulative plastic may include insulative reinforcing material such as glass fibers. In some embodiments, the first wafer housings 810 may be molded over the first plurality of conductive elements 410 to form the first wafers 510 as integrated pieces. The second wafer housings 820 may be molded over the second plurality of conductive elements 420 to form the second wafers 520 as integrated pieces. Optionally, the first wafer housings 810 and the second wafer housings 820 may hold the first plurality of conductive elements 410 and the second plurality of conductive elements 420, respectively, such that they are insulated from each other, and also provide mounting portions, by which these wafers may be fixed together and also fixed to the insulating housing 300.

The first wafer housings 810 may extend in the extension direction of the conductive elements 410 for holding the conductive elements 410. In embodiments where the conductive elements 410 are substantially L-shaped, the first wafer housings 810 may also be substantially L-shaped. The second wafer housings 820 may extend in the extension direction of the conductive elements 420 for holding the conductive elements 420. In embodiments where the conductive elements 420 are substantially linear, the second wafer housings 820 may be substantially rectangular. The second wafer housings 820 may be stacked on the first wafer housings 810. The first wafer housings 810 may be configured to support the second wafer housings 820, thereby improving the structural stability and making the electrical connector 200 more compact. The first wafer housings 810 on two opposed sides of the first slot 301 may be in close proximity to each other. The second wafer housings 820 on two opposed sides of the first slot 301 may also be in close proximity to each other. Exemplarily, the first wafer housings 810 and the second wafer housings 820 may be disposed successively in a direction parallel to the first column (parallel to the longitudinal direction X-X) and away from the mounting ends 412 of the conductive elements 410. The first wafers 510 and the second wafers 520 may be disposed successively in the longitudinal direction X-X. In the case where the first mounting interface 512 formed by the first wafers 510 is connected to the printed circuit board 920, the second wafers 520 may be supported by the first wafers 510 at a position having a sufficiently large gap from the printed circuit board 920. In this way, even if there are other electrical devices connected to the printed circuit board 920, there can be sufficient space to allow the second mounting interface 522 to be connected with an electrical device, such as the cable component 930.

Exemplarily, as shown in FIGS. 5A-5B, the second plurality of conductive elements 420 may be divided into a plurality of groups, such as, but not limited to, the two groups as shown in the drawings, three, four and more groups. In this way, the conductive elements 420 can be grouped to transmit signals. These groups of conductive elements 420 may be the similar or different. As shown in FIGS. 3A-3B, these groups of conductive elements 420 may be separated by a member, such as a rib 303, a block, or any suitable structure on the insulating housing 300. The mounting ends 422 of the groups of conductive elements 420 may be aligned in the same column. The mating ends 421 of the groups of conductive elements 420 may be aligned in the same column. Such a configuration may enable the conductive elements 420 to mate with the add-in card 910 and the cable component 930. Exemplarily, as shown in FIGS. 5A-5B, each group of conductive elements 420 may be held by the corresponding second wafer housings 820. The second wafer housings 820 for holding different groups of conductive elements 420 may be disposed successively in a direction parallel to the first column.

Exemplarily, the mating ends 421 and the mounting ends 422 of the conductive elements 420 may be in symmetry, as shown in FIGS. 5A-5B and 7A-7B. For example, the mating ends 421 and the mounting ends 422 may be in symmetry with respect to a plane perpendicular to the vertical direction Z-Z. In this way, the conductive elements 420 have a simple structure and are inexpensive to manufacture.

In embodiments where the conductive elements 410 are used to transmit signals at the first speed and the conductive elements 420 are used to transmit signals at the second speed, the conductive elements 420 may include pairs of signal conductive elements 420*a*, as shown in FIG. 7B, for example, differential signal pairs. The differential signal pairs may be configured to carry high data-rate signals (e.g., signals carrying data rates over 25 Gb/sec with PAM4 encoding) or high-frequency signals (e.g., over 56 or 112 Gb/sec), according to some implementations. Ground conductive elements 420*b* may separate the pairs of signal conductive elements 420*a*. For any adjacent two pairs of signal conductive elements 420*a*, a ground conductive element 420*b* may be disposed therebetween to reduce crosstalk. The intermediate portions 403 of the pairs of signal conductive elements 420*a* may have undulating portions at the sides towards each other. Exemplarily, the undulating portions may include notches 403*a*. Exemplarily, the undulating portions may include serrations 403*b*. The undulating portions may adjust the gaps in the pairs of signal conductive elements 420*a* to achieve different inductance and/or capacitance designs. The inductance and/or capacitance may be adjusted for different purposes, for example, system matching impedance can be adjusted for different server systems by changing the localized inductance and/or capacitance; or for maintaining balanced impedances within the differential signal pairs. Such adjustments for inductance and/or capacitance may be needed by high-speed differential signal pairs.

Optionally, as shown in FIG. 6B, the intermediate portion 403 of each conductive element 410 may have a uniform width D in its length direction. With this configuration, the conductive elements 410 may have a simple structure and may be inexpensive to manufacture.

Exemplarily, as shown in FIGS. 4 and 8A-8C, the insulating housing 300 may comprise a first insulating housing 310 and a second insulating housing 320. The first insulating housing 310 and the second insulating housing 320 may be of the same or different materials. The first slot 301 may be provided in the first insulating housing 310. The second slot 302 may be provided in the second insulating housing 320. The second insulating housing 320 may be directly or indirectly attached to the first insulating housing 310. The second insulating housing 320 may be shorter than the first insulating housing 310 in the direction (i.e., the longitudinal direction X-X) perpendicular to the mating direction.

The first wafer housings 810 may be connected to the first insulating housing 310 substantially at a position where the first insulating housing 310 extends beyond the second insulating housing 320. In some examples, the first wafer housings 810 may be, in the vertical direction Z-Z, inserted into the portion of the first insulating housing 310 beyond the second insulating housing 320. Exemplarily, the first insulating housing 310 and the second insulating housing 320 may be aligned at their upper ends. The mounting ends 412 of the conductive elements 410 may protrude from the portion of the first insulating housing 310 beyond the second insulating housing 320. Such a configuration may make it convenient for the mounting ends 412 of the conductive elements 410 to be mounted onto the printed circuit board 920.

The first wafer housings 810 may be secured to the first insulating housing 310. The second wafer housings 820 may be secured to the first insulating housing 310 and the second insulating housing 320. In this way, the first wafer housings 810 and the second wafer housings 820 may be fixed to each other.

In some embodiments, as shown in FIGS. 4, 5A-5B, 6A-6C, 7A-7C, and 8A-8C, first protrusions 811 may be provided on the sidewalls of the first wafer housings 810. First grooves 311*a* may be provided in the sidewalls of the portion of the first insulating housing 310 that extends beyond the second insulating housing 320. The ends of the first wafer housings 810 adjacent to the mating ends 411 may be inserted into the first insulating housing 310 such that the first protrusions 811 are engaged with the first grooves 311*a*. In this way, the first wafer housings 810 may be connected to the first insulating housing 310. First blocks 812 may also be provided on the sidewalls of the first wafer housings 810. When the first protrusions 811 are engaged with the first grooves 311*a*, the first blocks 812 may abut against the first insulating housing 310, providing a position limit.

In combination with FIGS. 4 and 5A-5B, as shown, in the embodiments where several first wafer housings 810 are included, the electrical connector 200 may further comprise a strengthening sheet 710. Mounting portions 813 may be provided on the ends of the first wafer housings 810 adjacent to the mounting ends 412. The strengthening sheet 710 may be mounted to the mounting portions 813 in the longitudinal direction X-X to secure the first wafer housings 810 together.

Referring back to FIGS. 4 and 8A-8C, second protrusions 821*a* may be provided on the sidewalls of the second wafer housings 820. First grooves 311*b* may be provided in the sidewalls of the portion of the first insulating housing 310 that is aligned with the second insulating housing 320. The ends of the second wafer housings 820 adjacent to the mating ends 421 may be inserted into the portion of the first insulating housing 310 that is aligned with the second insulating housing 320, such that the second protrusions 821*a* are engaged with the first grooves 311*b*. In this way, the second wafer housings 820 can be connected to the first insulating housing 310. Second blocks 822 may also be provided on the sidewalls of the second wafer housings 820. When the second protrusions 821*a* are engaged with the first grooves 311*b*, the second block 822 may abut against the first insulating housing 310, providing a position limit.

Second protrusions 821*b* may also be provided on the sidewalls of the second wafer housing 820. For each second wafer 520, the second protrusions 821*b* and 821*a* may be disposed on both sides of the second block 822, respectively. Second grooves 321 may be provided in the sidewalls of the second insulating housing 320. The ends of the second wafer housing 820 adjacent to the mounting ends 422 may be inserted into the second insulating housing 320 so that the second protrusions 821*b* are engaged with the second grooves 321. In this way, the second wafer housings 820 may be connected to the second insulating housing 320. When the second protrusions 821*b* are engaged with the second grooves 321, the second blocks 822 may abut against the second insulating housing 320, providing a position limit.

Such configurations enable securing the first insulating housing 310, the second insulating housing 320, the first wafer housings 810, and the second wafer housings 820 together.

Exemplarily, as shown in FIGS. 3A-3E, 4 and 9, the electrical connector 200 may comprise an outer shell 600. The outer shell 600 may be made of materials with higher strength, such as metal. The outer shell 600 may be manufactured by, for example, die-casting, molding, or machining. The outer shell 600 may accommodate the insulating housing 300. The outer shell 600 may provide adequate mechanical support and protection for the insulating housing 300.

The outer shell 600 may hold the first insulating housing 310 and the second insulating housing 320 together. Exemplarily, the electrical connector 200 may further comprise a pair of U-shaped clamping members 720, as shown in FIG. 3B. The pair of U-shaped clamping members 720 may be inserted into two ends of the first slot 301 opposed to each other in the longitudinal direction X-X. Each of U-shaped clamping members 720 may be clamped between the insulating housing 300 and the outer shell 600 in order to secure the outer shell 600 to the insulating housing 300.

Exemplarily, as shown in FIGS. 3A-3C and 9, one or more recesses 610 may be provided in the inner sidewall of the outer shell 600. The recesses 610 may separate the outer shell 600 from the insulating housing 300. The recesses 610 may facilitate air circulation, thereby serving to a heat dissipation function.

Exemplarily, as shown in FIGS. 3A-3E, 4, and 9, the electrical connector 200 may comprise a latch 620. The latch 620 may be pivotably connected to the outer shell 600. In some examples, a pivoting portion 623 may be provided in the latch 620. A pivoting mating portion 630 may be provided on the outer shell 600. The pivoting portion 623 may be pivotably connected to the pivoting mating portion 630. One of the pivoting portion 623 and the pivoting mating portion 630 may be an opening; and the other may be a protrusion.

The latch 620 may be configured to lock to the cable component 930. After the mounting ends 422 of the conductive elements 420 are electrically connected to one end of the cable component 930, the latch 620 may be pivoted to a locking position to secure the connection between the cable component 930 and the electrical connector 200. Exemplarily, an engaging groove 931 may be provided in the sidewall of the cable component 930. The latch 620 may comprise a hook 621. The hook 621 may be engaged with the engaging groove 931 to achieve fixation of the cable component 930 to the electrical connector 200.

To facilitate pivoting the latch 620, the latch 620 may comprise an operating member 622. The operating member 622 may be disposed opposite the pivoting portion 623. The pivoting portion 623 may have any suitable structure, such as a handle. By controlling the operating member 622, users' experience can be improved. The operating member 622 may be provided with structures such as protrusions and/or recesses for anti-skidding.

Figure 9:
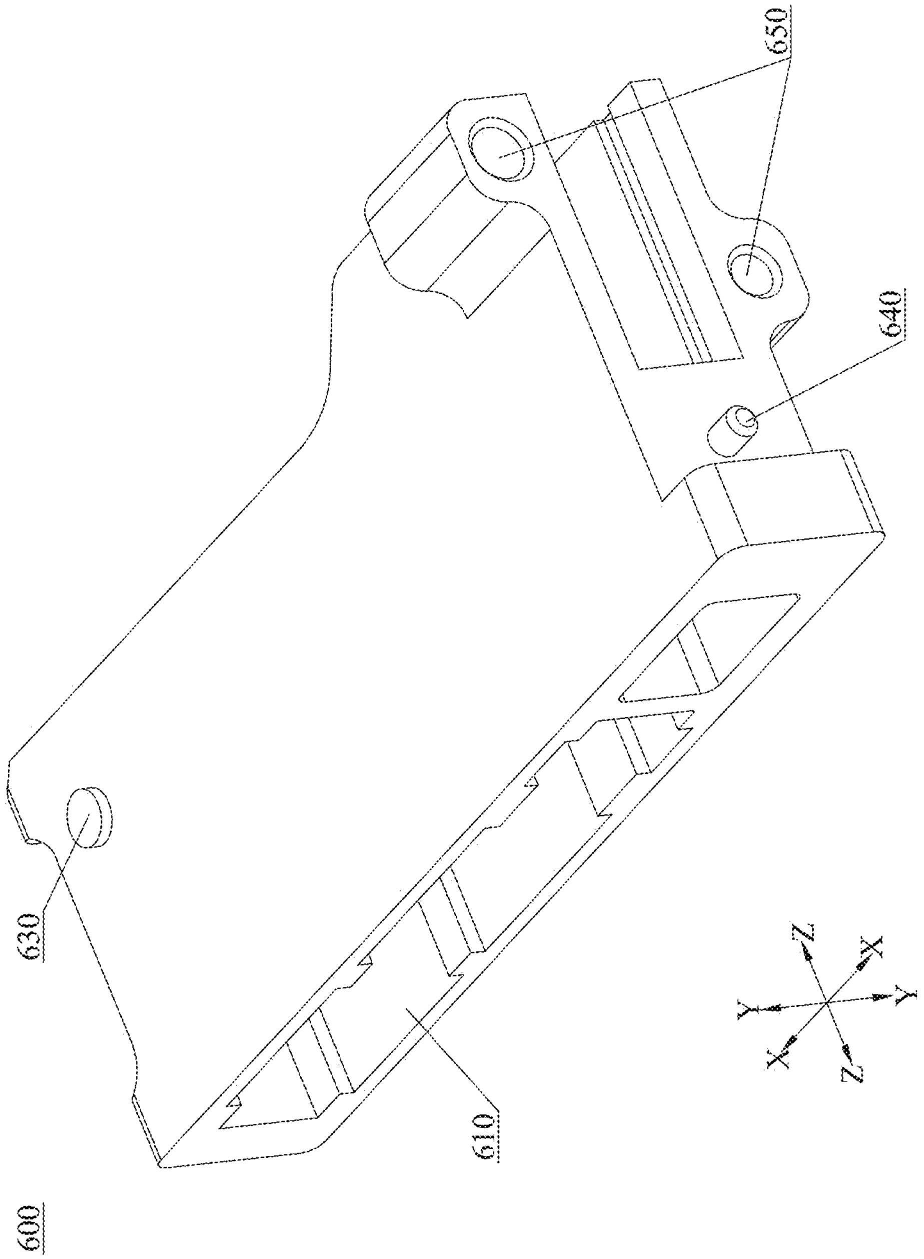
FIG. 9 is a perspective view of an outer shell of the electrical connector of FIG. 4.

Exemplarily, as shown in FIG. 9, the electrical connector 200 may further comprise a positioning post 640 and a threaded hole 650. The positioning post 640 and the threaded hole 650 may be used for connecting with the printed circuit board 920. When the mounting ends 412 of the conductive elements 410 are mounted to the printed circuit board 920, the positioning post 640 may be inserted into a positioning hole in the printed circuit board 920, thereby serving to a positioning function. Moreover, a connection member such as screw may penetrate the printed circuit board 920 and be threaded into the threaded hole 650, thereby achieving the fixation of the printed circuit board 920 to the electrical connector 200.

An exemplary method for manufacturing the electrical connector 200 is described below.

Figure 10:
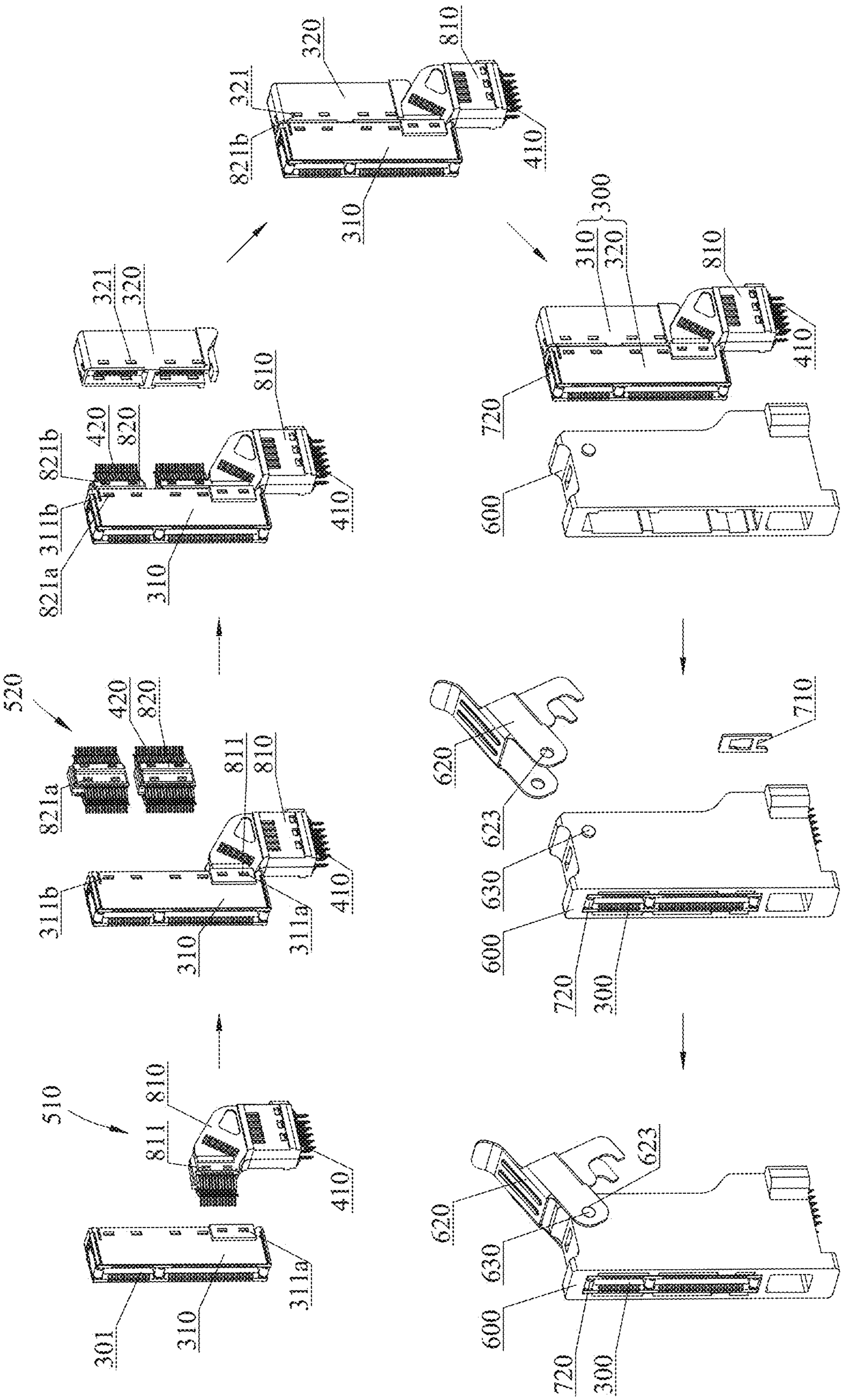
FIG. 10 is a schematic view illustrating a method of manufacturing the electrical connector of FIG. 4, according to some embodiments.

As shown in FIG. 10, the arrows schematically illustrate the assembly process of the electrical connector 200. The method may include forming the first wafers 510 by, for example, molding the first wafer housing 810 over the conductive elements 410. The method may include inserting the first wafers 510 into the first insulating housing 310 from a rear side opposite to the first slot 301. When the first wafers 510 are disposed in place with the first insulating housing 310, the first protrusions 811 on the first wafers 510 may engage with the first grooves 311*a* in the first insulating housing 310. The method may include forming the second wafers 520 by, for example, molding the second wafer housing 820 over the conductive elements 420. The method may include inserting the second wafers 520 into the first insulating housing 310 from the side backing to the first slot 301. When the second wafers 520 are connected in place with the first insulating housing 310, the second protrusions 821*a* on the second wafers 520 may engage with the first grooves 311*b* in the first insulating housing 310. It is to be noted that the connection of the conductive elements 410 to the first wafer housings 810 and/or the connection of the conductive elements 420 to the second wafer housings 820 may be done in advance or during assembly of the electrical connector 200. It is also to be noted that the order in which the first wafer housings 810 and the second wafer housings 820 are connected to the first insulating housing 310 may be arbitrary. The method may include disposing the second insulating housing 320 from a rear side such that the second insulating housing 320 may be connected to the second wafer housing 820. When the second insulating housing 320 is connected in place with the second wafer housing 820, the second protrusions 821*b* may engage the second grooves 321. The method may include inserting the insulating housing 300 into the outer shell 600. The method may include disposing components such as the strengthening sheet 710 and the latch 620 to predetermined positions.

Having thus described several aspects of several embodiments, it is to be appreciated that various alterations, modifications, and improvements will readily occur to those skilled in the art. Such alterations, modifications, and improvements are intended to be part of this disclosure and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

As an example, although many creative aspects have been described above with reference to right angle connectors, it should be understood that the aspects of the present disclosure are not limited to these. Any one of the creative features, whether alone or combined with one or more other creative features, can also be used for other types of electrical connectors, such as a card edge connector, a backplane connector, a daughter card connector, a stacking connector, a mezzanine connector, an I/O connector, a chip socket, a Gen Z connector, etc.

Moreover, although many creative aspects have been described above with reference to orthogonal connectors, it should be understood that the aspects of the present disclosure are not limited to these. Any one of the creative features, whether alone or combined with one or more other creative features, can also be used for other types of electrical connectors, such as coplanar connectors, vertical connectors or right angle connectors, etc.

Various variations may be made to the structures illustrated and described herein. For example, the plurality of conductive elements described above can be used to any suitable connector, such as a card edge connector, a backplane connector, a daughter card connector, a stacking connector, a mezzanine connector, an I/O connector, a chip socket, a Gen Z connector, etc.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like are shown based on the accompanying drawings, for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between 10±d1 and 20±d2" in some embodiments. The amount of variation d1, d2 for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation d1, d2 for a value could be as high as 50%. For example, if an operable range extends from 2 to 200, "approximately 80" may encompass values between 40 and 120 and the range may be as large as between 1 and 300. When only exact values are intended, the term "exactly" is used, e.g., "between exactly 2 and exactly 200." The term "essentially" is used to indicate that values are the same or at a target value or condition to within ±3%.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. For example, a process, method, system, product or device that contains a series of steps or units need not be limited to those steps or units that are clearly listed, instead, it may include other steps or units that are not clearly listed or are inherent to these processes, methods, products or devices. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

In the claims, as well as in the specification above, use of ordinal terms such as "first," "second," "third," etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An electrical connector having a mounting interface configured to face a circuit board, the electrical connector comprising: a housing comprising a slot elongating in a first direction perpendicular to both a mating direction and the mounting interface; and a plurality of conductive elements held by the housing, each of the plurality of conductive elements comprising a first end curving into the slot and a second end opposite the first end, wherein: the first ends of the plurality of conductive elements are arranged in a first column parallel to the first direction; the second ends of a first subset of the plurality of conductive elements are configured to mount to the circuit board in the first direction, and are arranged in one or more rows perpendicular to the first column; and the second ends of a second subset of the plurality of conductive elements are arranged in a second column parallel to the first column.

2. The electrical connector of claim 1, wherein:

the second ends of the first subset of the plurality of conductive elements are arranged in two rows.

3. The electrical connector of claim 1, wherein:

the slot is a first slot;

the housing comprises a second slot elongating in the first direction perpendicular to the mating direction; and the second ends of the second subset of conductive elements curve into the second slot.

4. The electrical connector of claim 1, comprising:

a first wafer housing holding the first subset of conductive elements; and a second wafer housing holding the second subset of conductive elements, wherein:

the second wafer housing is stacked on the first wafer housing.

5. The electrical connector of claim 1, wherein:

the plurality of conductive elements comprise a third subset of conductive elements separated from the second subset of conductive elements by a member of the housing; and second ends of the third subset of conductive elements are arranged in the second column.

6. The electrical connector of claim 1, comprising:

a shell holding the housing and comprising grooves separating portions of the shell from the housing.

7. The electrical connector of claim 6, comprising:

a latch pivotably connected to the shell.

8. The electrical connector of claim 1, wherein:

the housing comprises a first housing comprising the slot and a second housing attached to the first housing; and the second housing is shorter than the first housing in the first direction perpendicular to the mating direction.

9. The electrical connector of claim 8, comprising:

a first wafer housing holding the first subset of conductive elements, wherein:

the second housing is stacked on the first wafer housing.

10. An electrical connector comprising:

a plurality of conductive elements each comprising a first end and a second end opposite the first end, the plurality of conductive elements comprising a first subset of conductive elements and a second subset of conductive elements;

a first wafer comprising a first interface and a second interface perpendicular to the first interface, the first interface comprising the first ends of the first subset of conductive elements, the second interface comprising the second ends of the first subset of conductive elements;

a second wafer comprising a third interface aligned with and stacked above the first interface, and a fourth interface parallel to the third interface, the third interface comprising the first ends of the second subset of conductive elements, the fourth interface comprising the second ends of the second subset of conductive elements;

a shell holding the first wafer and the second wafer, the shell comprising a front slot exposing both the first interface and the third interface, and a rear slot exposing the second interface; and a latch pivotably connected to the shell and configured to secure a mating component at the second interface.

11. The electrical connector of claim 10, wherein, for the first subset of conductive elements:

every other conductive element comprises a bend such that the second ends are disposed in two rows.

12. The electrical connector of claim 10, wherein, for the second subset of conductive elements:

the first ends and the second ends are in symmetry with respect to a plane parallel to the first interface.

13. The electrical connector of any of claim 10, wherein:

the second subset of conductive elements are configured to carry signals at a speed higher than the first subset of conductive elements.

14. The electrical connector of claim 13, wherein:

each of the conductive elements comprise an intermediate portion between the first end and the second end; and the second subset of conductive elements comprise pairs of conductive elements having intermediate portions jogging towards each other.

15. The electrical connector of claim 14, wherein:

the intermediate portion of each of the first subset of conductive elements has a uniform width along its length.

16. An electrical connector comprising:

a housing comprising a slot elongating in a direction perpendicular to a mating direction;

a first plurality of conductive elements held by the housing, each of the first plurality of conductive elements comprising a first end curving into the slot and a second end opposite the first end and configured to mount to a printed circuit board;

a second plurality of conductive elements held by the housing, each of the second plurality of conductive elements comprising a first end curving into the slot and a second end opposite the first end and configured to mate with a cable component; and a shell holding the housing, the shell comprising an opening separate from the slot of the housing and aligned with the slot of the housing in the direction perpendicular to the mating direction.

17. The electrical connector of claim 16, wherein:

the first end of each of the first plurality of conductive elements comprises a tip having a first length;

the first end of each of the second plurality of conductive elements comprises a tip having a second length; and the second length is shorter than the first length.

18. The electrical connector of claim 16, wherein:

the second plurality of conductive elements comprise pairs of signal conductive elements separated by ground conductive elements.

19. The electrical connector of claim 16, wherein:

the housing comprises a first housing comprising the slot and a second housing attached to the first housing; and the second housing is shorter than the first housing in the direction perpendicular to the mating direction.

20. The electrical connector of claim 19, wherein:

the first plurality of conductive elements are held by a wafer housing; and the second housing is stacked on the wafer housing.

* * * * *